US012658360B2

(12) United States Patent
Kawase et al.

(10) Patent No.: US 12,658,360 B2
(45) Date of Patent: Jun. 16, 2026

(54) LENS BARREL, CAMERA, IMAGING APPARATUS, AND COIL COMPONENT

(71) Applicant: CANON KABUSHIKI KAISHA, Tokyo (JP)

(72) Inventors: Yoshitaka Kawase, Kanagawa (JP); Kazunori Masuda, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 18/509,037

(22) Filed: Nov. 14, 2023

(65) Prior Publication Data

US 2024/0161974 A1      May 16, 2024

(30) Foreign Application Priority Data

Nov. 16, 2022     (JP) ................................. 2022-183493

(51) Int. Cl.
| | |
|---|---|
| *H01F 38/14* | (2006.01) |
| *H01F 27/28* | (2006.01) |
| *H01F 27/29* | (2006.01) |
| *H04N 23/54* | (2023.01) |
| *H04N 23/55* | (2023.01) |

(52) U.S. Cl.
CPC ......... *H01F 38/14* (2013.01); *H01F 27/2828* (2013.01); *H01F 27/292* (2013.01); *H04N 23/54* (2023.01); *H04N 23/55* (2023.01)

(58) Field of Classification Search
CPC .............................. H04N 23/52; H01F 17/045
See application file for complete search history.

(56) References Cited

U.S. PATENT DOCUMENTS

| | | | |
|---|---|---|---|
| 2001/0024152 A1 | 9/2001 | Miyazaki | |
| 2011/0090037 A1* | 4/2011 | Tsai | H01F 27/324 |
| | | | 336/220 |
| 2014/0078350 A1* | 3/2014 | Aoki | H04N 23/52 |
| | | | 348/241 |
| 2019/0006078 A1 | 1/2019 | Sakai | |
| 2020/0013545 A1 | 1/2020 | Takahashi | |

(Continued)

FOREIGN PATENT DOCUMENTS

| | | |
|---|---|---|
| JP | S61112625 A | 5/1986 |
| JP | H0626228 A | 2/1994 |
| JP | 2000150270 A | 5/2000 |

(Continued)

*Primary Examiner* — Noam Reisner

(74) *Attorney, Agent, or Firm* — Canon U.S.A., Inc. IP Division

(57) ABSTRACT

A lens barrel includes a printed-wiring board located on an outside of a lens as viewed in a first direction in which an optical axis of the lens extends and including a first principal surface on an object side, and a coil component including a winding portion and a core portion and mounted on the first principal surface of the printed-wiring board. The core portion includes first and second winding core portions with a gap therebetween in an axial direction in which the first and second winding core portions extend, around which the winding portion is wound. A number of turns of the winding portion around the first winding core portion is smaller than a number of turns of the winding portion around the second winding core portion. The first winding core portion is located on a side closer to an optical axis than the second winding core portion.

14 Claims, 12 Drawing Sheets

(56) References Cited

U.S. PATENT DOCUMENTS

| | | | | |
|---|---|---|---|---|
| 2021/0258461 A1* | 8/2021 | Ye | .......................... | H04N 23/67 |
| 2022/0373764 A1* | 11/2022 | Ye | .......................... | H04N 23/55 |

FOREIGN PATENT DOCUMENTS

| | | | |
|---|---|---|---|
| JP | 2003007542 A | 1/2003 |
| JP | 2003059727 A | 2/2003 |
| JP | 2016005061 A | 1/2016 |
| JP | 2018133354 A | 8/2018 |
| JP | 2019003992 A | 1/2019 |
| JP | 2020187232 A | 11/2020 |
| JP | 2021128288 A | 9/2021 |
| JP | 2022150648 A | 10/2022 |

* cited by examiner

FIG.12

LENS BARREL, CAMERA, IMAGING APPARATUS, AND COIL COMPONENT

BACKGROUND

Field

The present disclosure relates to a lens barrel, a camera, an imaging apparatus, and a coil component.

Description of the Related Art

In imaging apparatuses such as digital cameras including an image sensor, the linkage of magnetic field noise with the image sensor causes a disturbance in a captured image. As the International Organization for Standardization (ISO) sensitivity of imaging apparatuses has recently increased, a disturbance occurs in an image due to small magnetic field noise generated from small electronic components, such as transformers and conductors, which have posed no problem in the past. Japanese Patent Application Laid-Open No. 2018-133354 discusses a coil component for reducing a magnetic flux leaking from a magnetic gap.

However, in the coil component discussed in Japanese Patent Application Laid-Open No. 2018-133354, a plate-like core is used to shield the leaking magnetic flux, and the magnetic flux leaking in a direction in which the plate-like core is not provided cannot be fully reduced.

SUMMARY

According to a first aspect of the present disclosure, a lens barrel includes a lens, a printed-wiring board located on an outside of the lens as viewed in a first direction in which an optical axis of the lens extends and including a first principal surface on an object side in the first direction and a second principal surface on an imaging plane side in the first direction, and a coil component including a winding portion and a core portion and mounted on the first principal surface of the printed-wiring board, wherein the core portion includes a first winding core portion and a second winding core portion located with a gap therebetween in an axial direction in which the first and second winding core portions extend, around which the winding portion is wound, a first magnetic outer wall located in the axial direction and configured to hold the first winding core portion, a second magnetic outer wall located in the axial direction and configured to hold the second winding core portion, and a third magnetic outer wall configured to be held by the first magnetic outer wall and the second magnetic outer wall, wherein the first winding core portion and the second winding core portion are located between the third magnetic outer wall and the first principal surface, and wherein a number of turns of the winding portion around the first winding core portion is smaller than a number of turns of the winding portion around the second winding core portion, and the first winding core portion is located on a side closer to the optical axis than the second winding core portion.

According to a second aspect of the present disclosure, an imaging apparatus includes an image sensor, a printed-wiring board including a first principal surface located on a side closer to the image sensor, and a second principal surface located on an opposite side of the side closer to the image sensor, and a coil component including a winding portion and a core portion and mounted on the second principal surface of the printed-wiring board, wherein the core portion of the coil component includes a first winding core portion and a second winding core portion located with a gap therebetween in an axial direction in which the first and second winding core portions extend, around which the winding portion is wound, a first magnetic outer wall located in the axial direction and configured to hold the first winding core portion, a second magnetic outer wall located in the axial direction and configured to hold the second winding core portion, and a third magnetic outer wall configured to be held by upper portions of the first magnetic outer wall and the second magnetic outer wall, and wherein a number of turns of the winding portion around the first winding core portion is smaller than a number of turns of the winding portion around the second winding core portion, and the first winding core portion is located on a side closer to an optical axis of the image sensor than the second winding core portion.

According to a third aspect of the present disclosure, a coil component includes a winding portion, a core portion, and a mounting surface, wherein the core portion includes a first winding core portion and a second winding core portion located with a gap therebetween in an axial direction in which the first and second winding core portions extend, around which the winding portion is wound, a first magnetic outer wall located in the axial direction and configured to hold the first winding core portion, a second magnetic outer wall located in the axial direction and configured to hold the second winding core portion, a third magnetic outer wall configured to be held by upper portions of the first magnetic outer wall and the second magnetic outer wall, and a fourth magnetic outer wall configured to be held by side portions of the first magnetic outer wall and the second magnetic outer wall, wherein the core portion covers the winding portion except for the mounting surface, and wherein a number of turns of the winding portion around the first winding core portion is smaller than a number of turns of the winding portion around the second winding core portion.

Further features of the present disclosure will become apparent from the following description of exemplary embodiments with reference to the attached drawings.

BRIEF DESCRIPTION OF THE DRAWINGS

FIG. 12 illustrates results of a magnetic field distribution simulation from transformers of Sample 4 and Sample 3 to an image sensor surface.

DESCRIPTION OF THE EMBODIMENTS

Exemplary embodiments of the present disclosure will be described in detail below with reference to the drawings.

Figure 1:
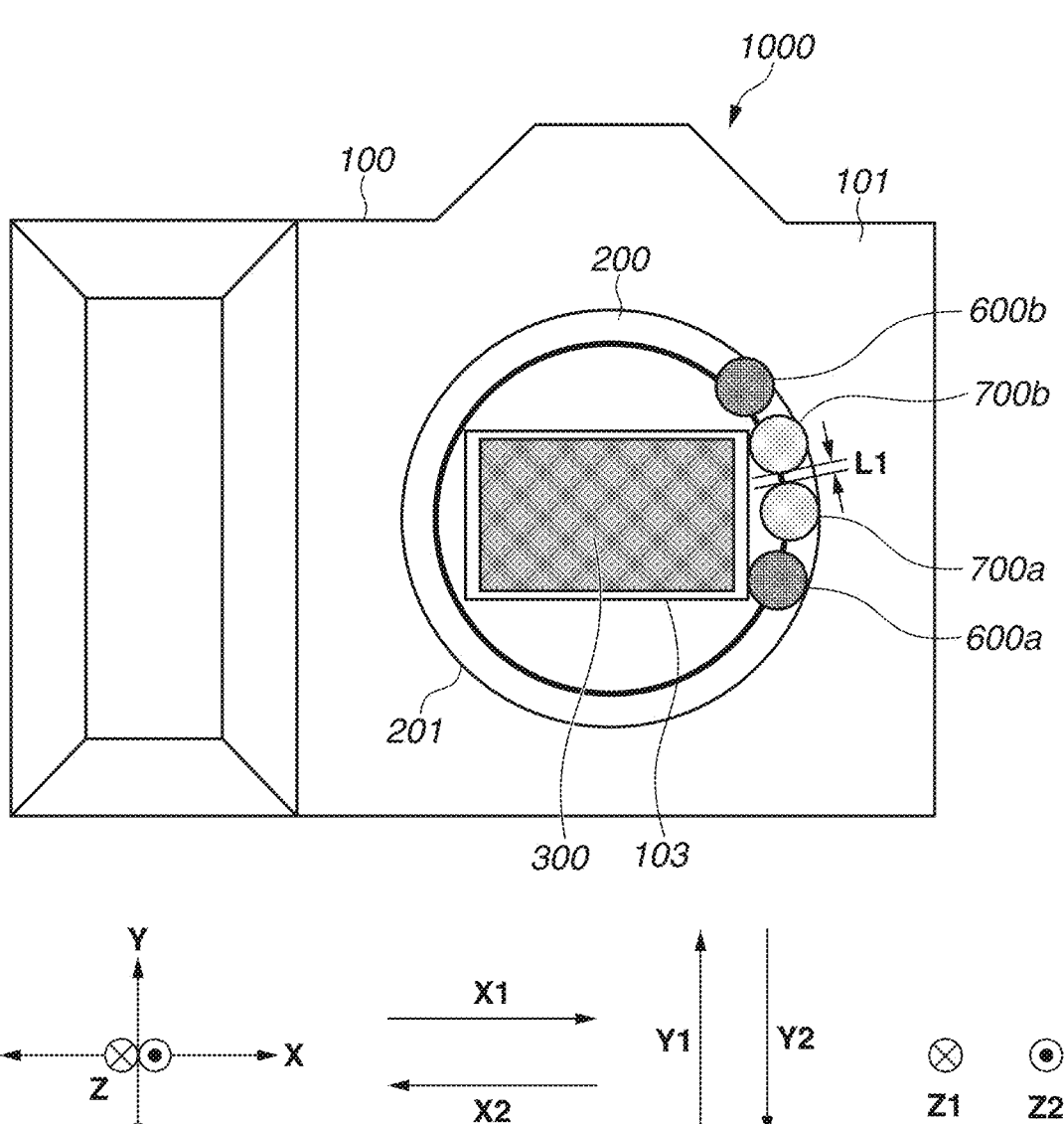
FIG. 1 is an explanatory diagram illustrating a digital camera as an example of an imaging apparatus according to a first exemplary embodiment.
Figure 2:
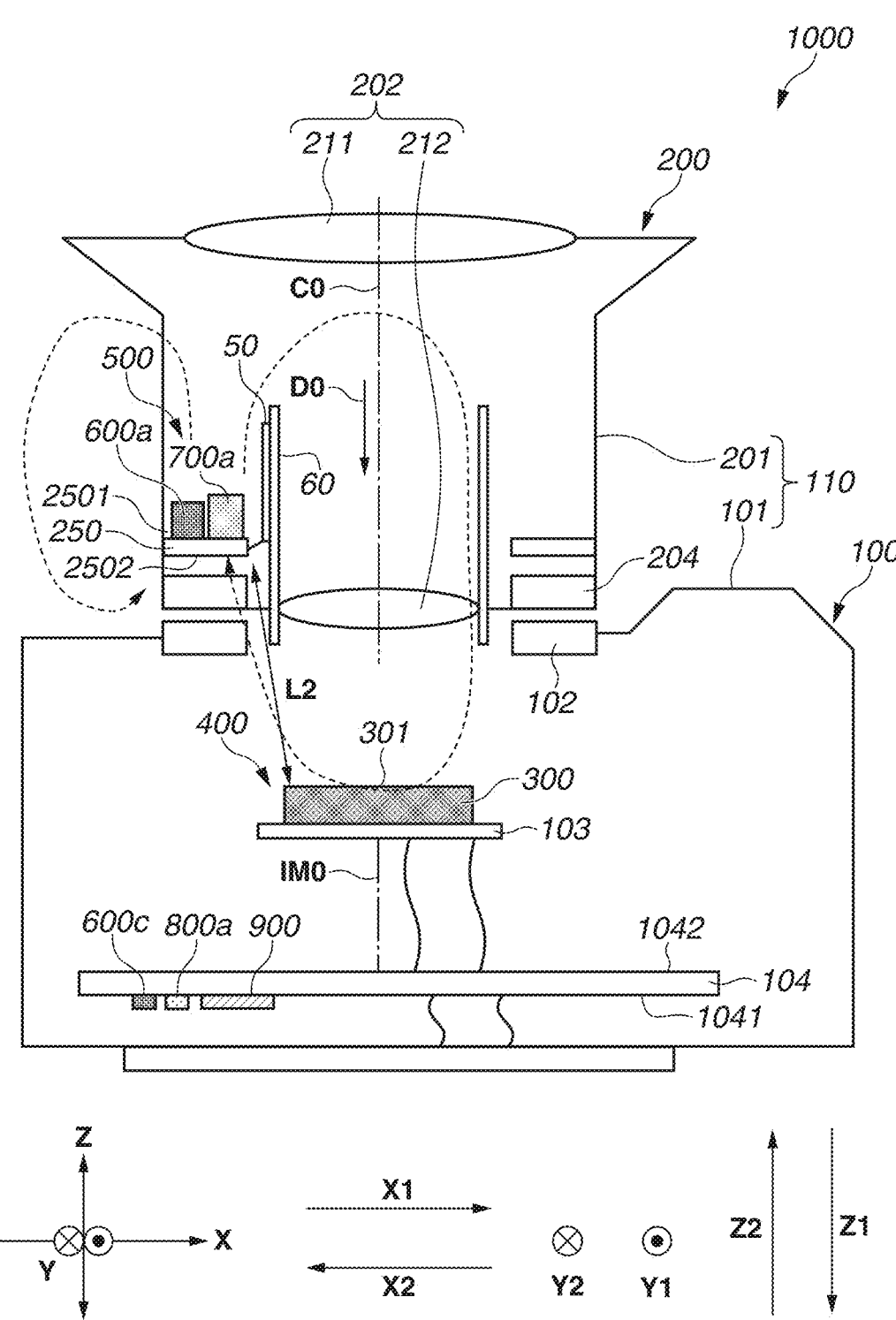
FIG. 2 is an explanatory diagram illustrating the digital camera as an example of the imaging apparatus according to the first exemplary embodiment.

FIGS. 1 and 2 are explanatory diagrams each illustrating a digital camera 1000 as an example of an imaging apparatus according to a first exemplary embodiment. FIG. 1 is a schematic diagram of the digital camera 1000 as viewed from the front. FIG. 2 is a schematic diagram of the digital camera 1000 as viewed from the top.

The digital camera 1000 is, for example, a digital single-lens reflex camera or a digital single-lens mirrorless camera. The digital camera 1000 includes a camera body 100 serving as an imaging apparatus (imaging unit), and a lens barrel 200 that is attachable to and detachable from the camera body 100. The lens barrel 200 is an interchangeable lens. A positional relationship between the components of the lens barrel 200 and the components of the camera body 100 will be described based on an assumption that the lens barrel 200 is mounted on the camera body 100.

The camera body 100 includes an exterior case 101. The exterior case 101 is a part of a casing 110 of the digital camera 1000 and is a casing of the camera body 100. The exterior case 101 includes a mounting portion 102 as a camera mount on which the lens barrel 200 is mounted. The mounting portion 102 is formed in a ring shape in a front view.

The camera body 100 includes an imaging unit 400 located in the exterior case 101. The imaging unit 400 includes an image sensor 300 including a light-receiving surface 301, electronic components (not illustrated) for controlling image signals, a printed-wiring board 103 on which the image sensor 300 and the electronic components (not illustrated) are mounted, and a printed-wiring board 104. The imaging unit 400 includes a camera-shake correction function, and includes an actuator (not illustrated) for controlling the position of the image sensor 300.

The printed-wiring board 104 includes a principal surface 1041 and a principal surface 1042. As for the two principal surfaces 1041 and 1042 of the printed-wiring board 104, the principal surface 1042 is a first principal surface that is located close to the image sensor 300, and the principal surface 1041 is a second principal surface that is located on the opposite side of the side close to the image sensor 300. The principal surface 1041 is the second principal surface that is farther from the image sensor 300 than the principal surface 1042. The principal surface 1041 perpendicularly intersects a virtual line IMO that extends in a vertical direction from the center of the light-receiving surface 301 of the image sensor 300. The virtual line IMO is aligned with a line extending from an optical axis C0. In other words, the optical axis C0 corresponds to the optical axis of the image sensor 300. The optical axis C0 of the image sensor 300 perpendicularly extends in the vertical direction from the center of the light-receiving surface 301 of the image sensor 300. The principal surface 1041 is opposed to the light-receiving surface 301 of the image sensor 300 in such a manner that the principal surface 1041 is in parallel with the light-receiving surface 301 of the image sensor 300. The principal surface 1042 is the first principal surface. The printed-wiring board 104 also includes a drive circuit 900 that drives the actuator (not illustrated), and an LC filter that eliminates an unwanted high-frequency current from the drive circuit 900. The LC filter includes an inductor 600c and a capacitor 800a as coil components. The drive circuit 900, the inductor 600c, and the capacitor 800a are mounted (implemented) on the principal surface 1041 that is the second principal surface of the printed-wiring board 104.

An XYZ coordinate system based on the image sensor 300 is defined as follows. A direction perpendicular to the light-receiving surface 301 of the image sensor 300 is defined as a Z-direction. A direction that is orthogonal to the Z-direction and is along the long sides of the light-receiving surface 301 of the image sensor 300 is defined as an X-direction. A direction along the short sides of the light-receiving surface 301 is defined as a Y-direction. In the Z-direction, a normal direction of the light-receiving surface 301 is defined as a Z2-direction, and a direction opposite to the normal direction of the light-receiving surface 301, that is, a direction opposite to the Z2-direction, is defined as a Z1-direction. The Z1-direction is a direction in which the light-receiving surface 301 of the image sensor 300 is viewed from the front side. As viewed in the Z2-direction, a rightward direction on the plane of FIG. 1 in the X-direction is defined as an X1-direction, and a leftward direction on the plane of FIG. 1, that is, a direction opposite to the X1-direction, is defined as an X2-direction. As viewed in the Z2-direction, an upward direction on the plane of FIG. 1 in the Y-direction is defined as a Y1-direction, and a downward direction on the plane of FIG. 1, that is, a direction opposite to the Y1-direction, is defined as a Y2-direction.

The lens barrel 200 includes a lens casing 201. The lens casing 201 is a part of the casing 110 of the digital camera 1000 and is a casing of the lens barrel 200. The lens barrel 200 is located in the lens casing 201, and includes an imaging optical system 202 that forms an optical image on the light-receiving surface 301 of the image sensor 300 when the lens barrel 200 is mounted on the exterior case 101. The lens barrel 200 also includes a lens mount 204 that is formed in a ring shape in a front view. The lens mount 204 functions as a connected portion to be connected to the mounting portion 102 of the exterior case 101. In the present exemplary embodiment, the exterior case 101 and the lens casing 201 constitute the casing 110 of the digital camera 1000.

The image sensor 300 is, for example, a complementary metal oxide semiconductor (CMOS) image sensor or a charge-coupled device (CCD) image sensor.

The image sensor 300 has a quadrangular outer shape as viewed in the Z1-direction. The image sensor 300 is located in the exterior case 101 such that the light-receiving surface 301 is opposed to the imaging optical system 202 in the optical axis direction when the lens barrel 200 is mounted on the exterior case 101. The image sensor 300 photoelectrically converts the optical image formed on the light-receiving surface 301 and outputs an image signal to the printed-wiring board 103.

The imaging optical system 202 includes a plurality of lenses including lenses 211 and 212. The lens 211 is an object-side lens located on a light incident side of the lens casing 201. The lens 212 is an imaging-apparatus-body-side lens located on a light exit side of the lens casing 201. The optical axis of the imaging optical system 202 is aligned with the optical axis C0 of the lens 212. The lens 211 is fixed to the lens casing 201. The lens 212 is supported by the lens casing 210 via a slider 60 so as to be slidable in the direction parallel to the optical axis C0. A light traveling direction that is parallel to the optical axis C0 is defined as a direction DO as indicated by an arrow in FIG. 2. The optical axis C0 perpendicularly intersects the light-receiving surface 301 of the image sensor 300. Accordingly, the direction DO coincides with the Z1-direction.

The lens barrel 200 is located in the lens casing 201, and includes a drive motor 50 that drives the lens 212 of the imaging optical system 202 via the slider 60. The lens barrel 200 also includes a drive module 500. The drive module 500 is located in the lens casing 201 and is located outside of the lens 212 as viewed in the direction DO. The drive module 500 supplies power to the drive motor 50 so as to control an operation of driving the lens 212 of the imaging optical system 202 by the drive motor 50.

The drive module 500 includes a printed-wiring board 250 and two inductors 600a and 600b and two transformers 700a and 700b that are mounted (implemented) on the printed-wiring board 250. FIG. 2 schematically illustrates only one of the two inductors 600a and 600b, that is, the inductor 600a, and only one of the two transformers 700a and 700b, that is, the transformer 700a.

The printed-wiring board 250 of the drive module 500 is formed in a shape that does not shield an optical path from the imaging optical system 202 to the light-receiving surface 301 of the image sensor 300. In the present exemplary embodiment, the printed-wiring board 250 is formed in a ring shape as viewed in the Z-direction. The inductors 600a and 600b and the transformers 700a and 700b are mounted on a principal surface 2501 of the printed-wiring board 250 that is opposite to a principal surface 2502 facing the camera body 100. The principal surface 2501 is the first principal surface, and the principal surface 2502 is the second principal surface. As for the two principal surfaces 2501 and 2502 of the printed-wiring board 250, the principal surface 2501 is first principal surface located on the object side in the direction DO in which the optical axis C0 extends, and the principal surface 2502 is the second principal surface located on the imaging plane side. The principal surface 2501 is located at a position farther from the light-receiving surface 301 of the image sensor 300 and the lens mount 204 of the lens barrel 200 than the principal surface 2502. A distance L1 between the transformer 700a and the transformer 700b is narrower than a distance L2 between the drive module 500 and the image sensor 300.

For the digital camera 1000, an auto focusing system of a contrast detection type that detects a signal corresponding to a focus evaluation value of an object and focuses on the object by driving the imaging optical system 202 by the drive module 500 is used.

Figure 3:
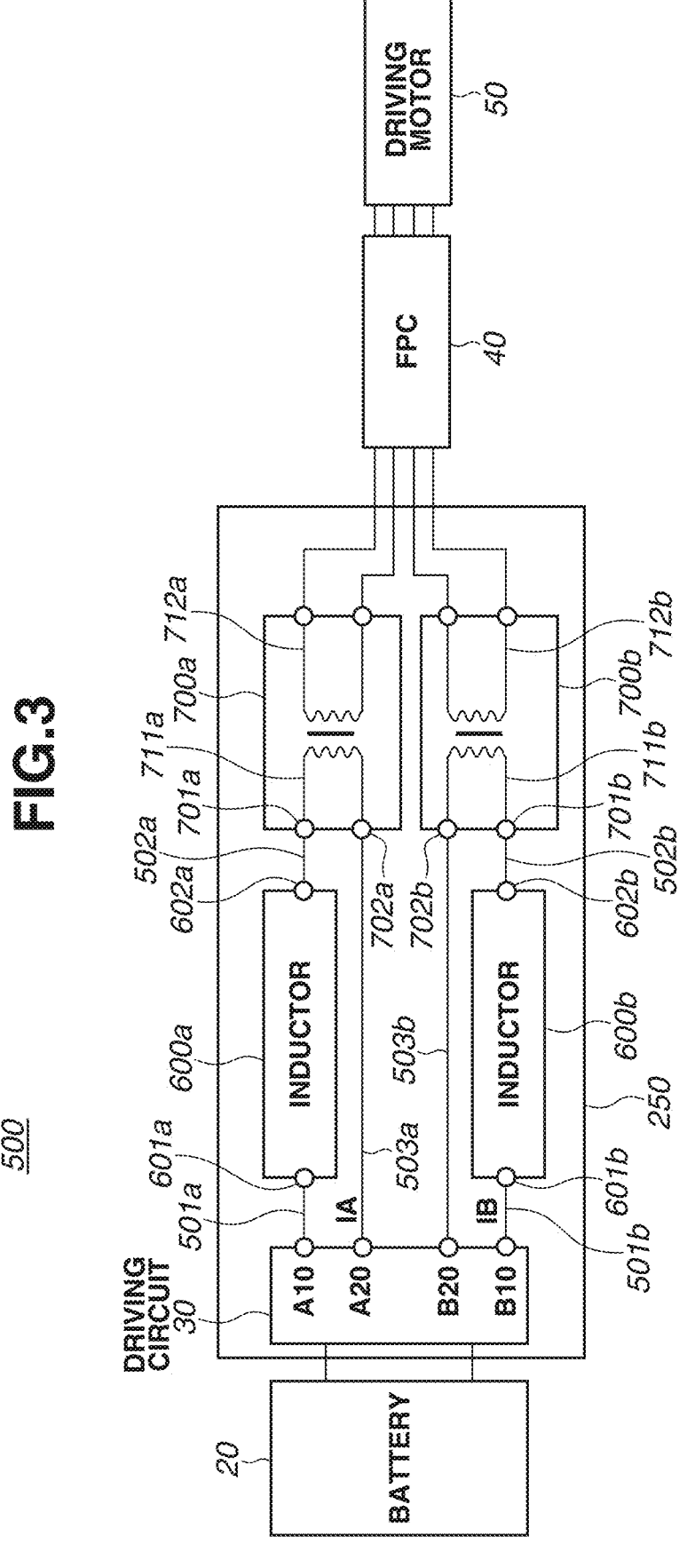
FIG. 3 is a block diagram illustrating a circuit configuration of a drive module and a drive motor according to the first exemplary embodiment.

FIG. 3 is a block diagram illustrating a circuit configuration of the drive module 500 and the drive motor 50 according to the first exemplary embodiment. A battery 20 is located in the exterior case 101 of the camera body 100. The drive module 500 includes a drive circuit 30 that is supplied with a direct-current (DC) voltage from the battery 20 and outputs an A-phase drive current IA and a B-phase drive current IB as alternating currents to operate the drive motor 50. The drive current IA is an example of a first alternating current. The drive current IB is an example of a second alternating current. The drive currents IA and IB of the respective phases are, for example, alternating currents having a drive frequency greater than or equal to 1 kHz and less than 1 MHz, that is, a driving frequency of a kHz band.

The drive module 500 includes the printed-wiring board 250, the drive circuit 30, the two inductors 600a and 600b, and the two transformers 700a and 700b that are mounted on the printed-wiring board 250. The two inductors 600a and 600b and the two transformers 700a and 700b are coil components. The drive circuit 30 includes terminals A10 and A20 for outputting the A-phase drive current IA, and terminals B10 and B20 for outputting the B-phase drive current IB. The printed-wiring board 250 includes a plurality of wiring patterns 501a, 502a, 503a, 501b, 502b, and 503b.

The inductor 600a includes two terminals 601a and 602a. The transformer 700a includes a primary winding 711a and a secondary winding 712a. The secondary winding 712a outputs a voltage obtained by stepping up a voltage applied to the primary winding 711a. The primary winding 711a includes two terminals 701a and 702a.

The terminal A10 of the drive circuit 30 and the terminal 601a of the inductor 600a are electrically connected with the wiring pattern 501a. The terminal 602a of the inductor 600a and the terminal 701a of the primary winding 711a of the transformer 700a are electrically connected with the wiring pattern 502a. The terminal 702a of the primary winding 711a and the terminal A20 of the drive circuit 30 are electrically connected with the wiring pattern 503a. Accordingly, the inductor 600a and the primary winding 711a of the transformer 700a are connected in series. Since the A-phase drive current IA is an alternating current, the drive current IA is periodically switched between the phase at which the drive current IA is output from the terminal A10 and the phase at which the drive current IA is output from the terminal A20. The phase at which the drive current IA is output from the terminal A10 is expressed as positive, and the phase at which the drive current IA is output from the terminal A20 is expressed as negative. When the drive current IA is positive, the drive current IA flows to the terminal A20 via the inductor 600a and the primary winding 711a. On the other hand, when the drive current IA is negative, the drive current IA flows to the terminal A10 via the primary winding 711a and the inductor 600a.

The inductor 600b includes two terminals 601b and 602b. The transformer 700b includes a primary winding 711b and a secondary winding 712b. The secondary winding 712b outputs a voltage obtained by stepping up a voltage applied to the primary winding 711b. The primary winding 711b includes two terminals 701b and 702b.

The terminal B10 of the drive circuit 30 and the terminal 601b of the inductor 600b are electrically connected with the wiring pattern 501b. The terminal 602b of the inductor 600b and the terminal 701b of the primary winding 711b of the transformer 700b are electrically connected with the wiring pattern 502b. The terminal 702b of the primary winding 711b and the terminal B20 of the drive circuit 30 are electrically connected with the wiring pattern 503b. Accordingly, the inductor 600b and the primary winding 711b of the transformer 700b are connected in series. Since the B-phase drive current IB is an alternating current, the drive current IB is periodically switched between the phase at which the drive current IB is output from the terminal B10 and the phase at which the drive current IB is output from the terminal B20. The phase at which the drive current IB is output from the terminal B10 is expressed as positive, and the phase at which the drive current IB is output from the terminal B20 is expressed as negative. When the drive current IB is positive, the drive current IB flows to the terminal B20 via the inductor 600b and the primary winding 711b. On the other hand, when the drive current IB is negative, the drive current IB flows to the terminal B10 via the primary winding 711b and the inductor 600b.

In such a manner, the drive circuit 30 supplies the drive current IA to the inductor 600a and the primary winding 711a of the transformer 700a that are connected in series, and the drive circuit 30 supplies the drive current IB to the inductor 600b and the primary winding 711b of the transformer 700b that are connected in series. A phase difference between the A-phase drive current IA output from the terminals A10 and A20 of the drive circuit 30 and the B-phase drive current IB output from the terminals B10 and B20 is in a range from −90 degrees to 90 degrees (both inclusive).

The A-phase drive current IA and the B-phase drive current IB flow to the drive motor 50 via a flexible printed circuit board (FPC) 40. An unwanted high-frequency current may be superimposed on the drive currents IA and IB output from the drive circuit 30. Therefore, the inductor 600a is located at the A-phase and the inductor 600b is located at the B-phase between the drive circuit 30 and the FPC 40 so as to eliminate the high-frequency current from the drive currents IA and IB. To step up the voltage output from the drive circuit 30, the transformer 700a is located at the A-phase and the transformer 700b is located at the B-phase between the drive circuit 30 and the FPC 40. Specifically, the A-phase drive current IA output from the drive circuit 30 is supplied to the drive motor 50 via the inductor 600a and the transformer 700a. The B-phase drive current IB output from the drive circuit 30 is supplied to the drive motor 50 via the inductor 600b and the transformer 700b.

If the current flows to each of the inductors 600a and 600b and the transformers 700a and 700b, a magnetic flux leaks from each of the inductors 600a and 600b and the transformers 700a and 700b. The leaking magnetic flux reaches the image sensor 300 illustrated in FIG. 2, which causes magnetic field noise in the image sensor 300. The leaking magnetic flux indicated by a dashed line arrow in FIG. 2 is an alternating magnetic field generated by an alternating current. Accordingly, the leaking magnetic flux is alternately switched between a direction indicated by the dashed line arrow and a direction opposite to the direction.

Figure 4:
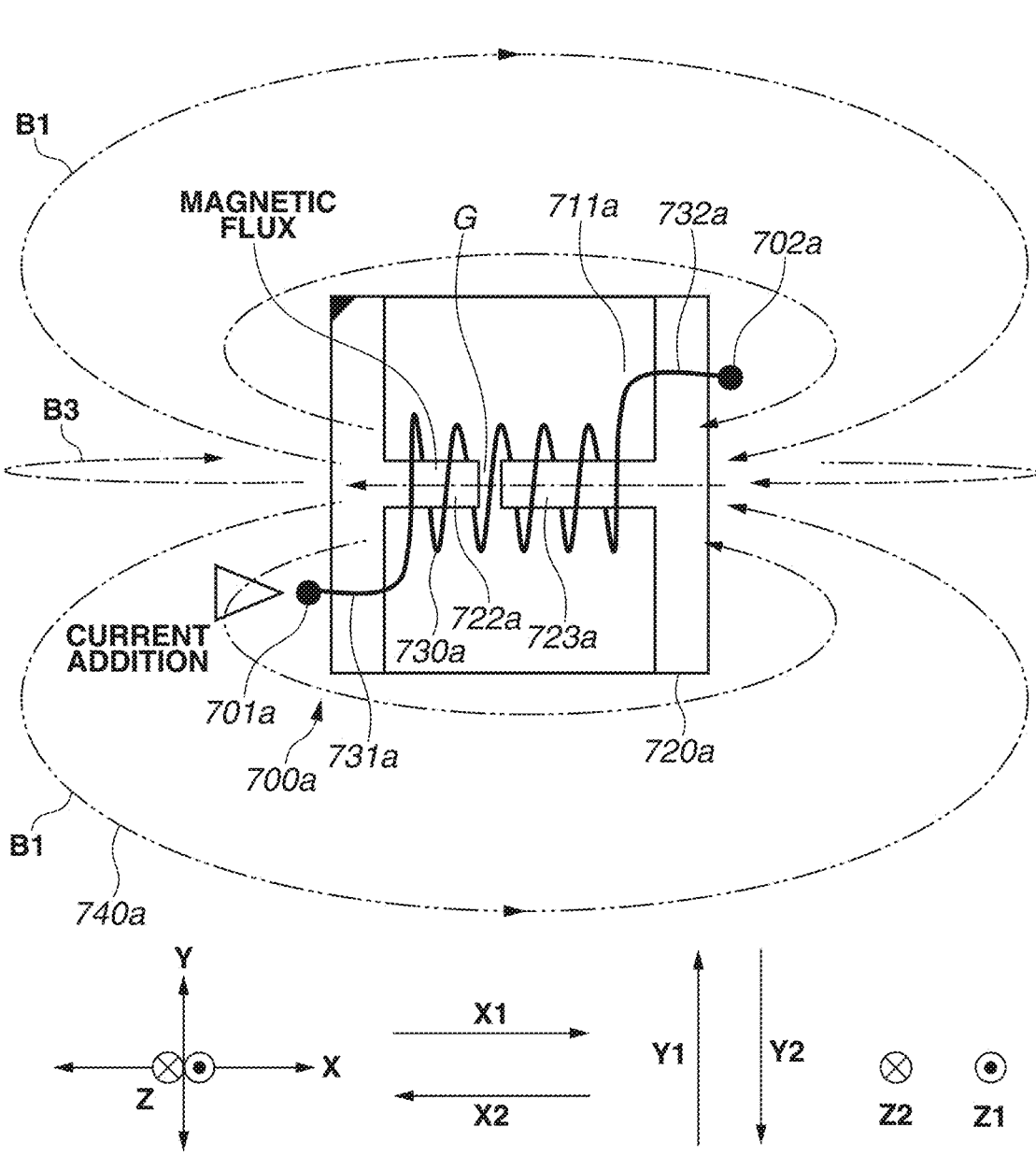
FIG. 4 is a bottom view of a transformer as an example of a coil component according to the first exemplary embodiment.
Figure 5:
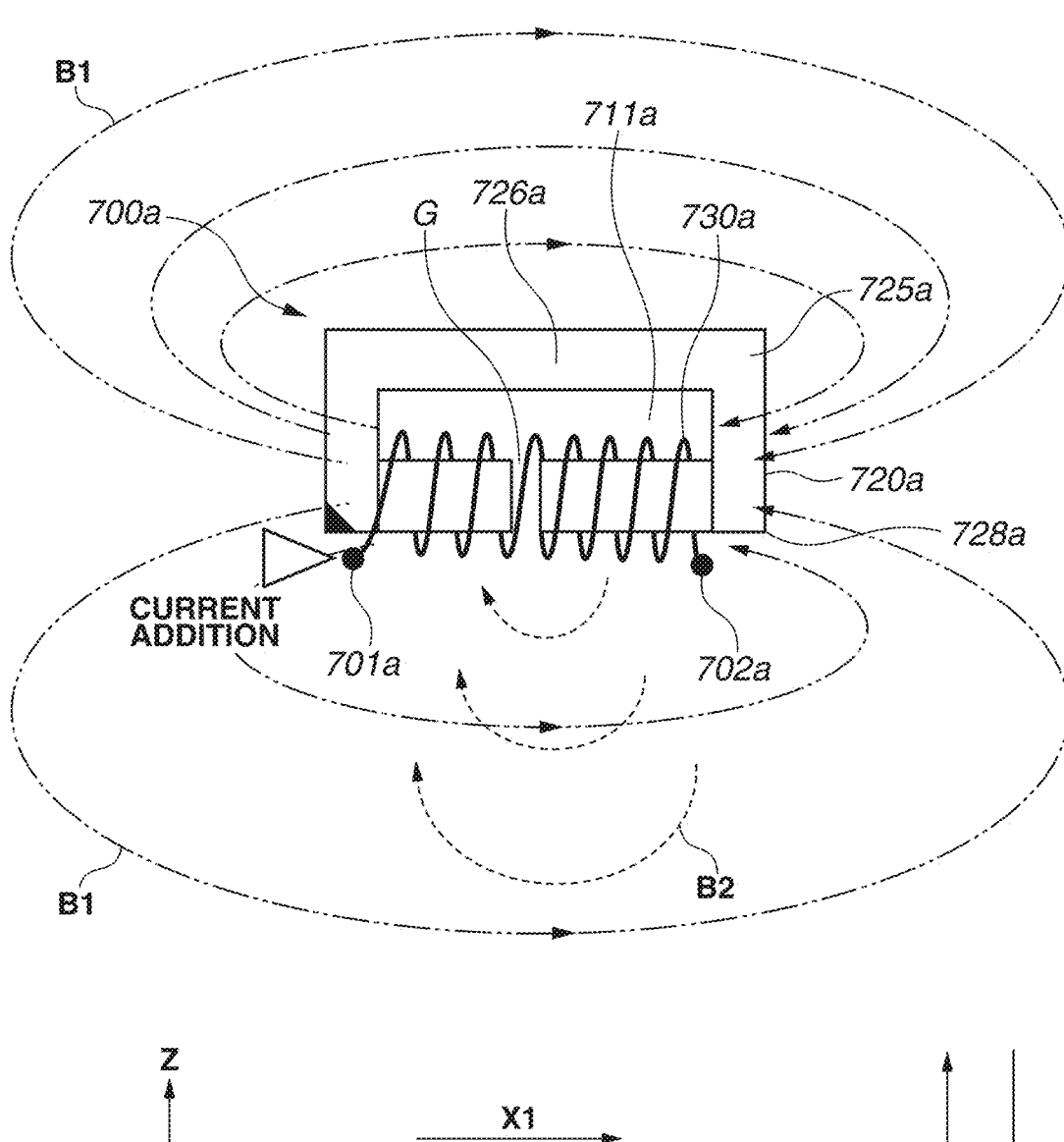
FIG. 5 is a side view of the transformer as an example of the coil component according to the first exemplary embodiment.

Next, a relationship between a current applied to the transformers 700a and 700b and a leaking magnetic flux will be described with reference to the transformer 700a. The transformer 700b has a configuration similar to that of the transformer 700a. FIGS. 4 and 5 are explanatory diagrams each illustrating an example of a transformer as a coil component according to the first exemplary embodiment. FIG. 4 is a schematic bottom view of the transformer 700a as viewed from a component mounting surface side, i.e., as viewed in the Z2-direction. FIG. 5 is a schematic side view of the transformer 700a as viewed from a component side surface side, i.e., as viewed in the Y2-direction. In FIGS. 4 and 5, the illustration of the secondary winding 712a is omitted for convenience of description.

The transformer 700a includes the primary winding 711a serving as a winding portion, a magnetic core 720a serving as a core portion, and the secondary winding 712a. The primary winding 711a includes a winding portion 730a, a pair of line portions 731a and 732a extending from the winding portion 730a, and the pair of terminals 701a and 702a. Like the primary winding 711a, the secondary winding 712a includes a winding portion, a pair of line portions extending from the winding portion, and a pair of terminals. The winding portion 730a of the primary winding 711a and the winding portion of the secondary winding 712a are wound around a part of the magnetic core 720a. As viewed in the X1-direction, the primary winding 711a is wound counterclockwise from the terminal 701a toward the terminal 702a. In FIGS. 4 and 5, a black triangle mark is put on a corner at which the terminal 701a is located.

The winding portion 730a and the pair of line portions 731a and 732a are formed of a continuous conductor line made of a conductive material such as copper. The line portion 731a is joined to the terminal 701a, and the line portion 732a is joined to the terminal 702a. The terminals 701a and 702a are each made of a conductive material. The terminals 701a and 702a are bonded to the magnetic core 720a.

A conductor line of the winding portion 730a is coated with an insulating material (not illustrated). Conductor lines of the line portions 731a and 732a, except for the portions joined to the terminals 701a and 702a, are coated with an insulating material (not illustrated).

The magnetic core 720a serving as a core portion includes a first winding core portion 722a, a second winding core portion 723a, a first magnetic outer wall 724a, a second magnetic outer wall 725a, a third magnetic outer wall 726a, and a mounting surface 728a including an opening. The magnetic core 720a is made of a magnetic material such as ferrite. The first winding core portion 722a and the second winding core portion 723a are located with a gap therebetween in the axial direction in which the first winding core portion 722a and the second winding core portion 723a extend. In the example of FIG. 4, the first winding core portion 722a and the second winding core portion 723a are located with a core gap G formed therebetween as a void. A non-magnetic material may be located instead of the core gap G. The winding portion 730a of the primary winding 711a and the winding portion of the secondary winding 712a are wound around the first winding core portion 722a and the second winding core portion 723a. The shape of each of the first winding core portion 722a and the second winding core portion 723a is not particularly limited and is, for example, a prism or cylindrical shape.

In the present exemplary embodiment, the number of turns of winding of the first winding core portion 722a is different from the number of turns of winding of the second winding core portion 723a.

One of the first winding core portion 722a and the second winding core portion 723a that has a smaller number of turns is desirably located at a position closer to the optical axis C0 than the other of the first winding core portion 722a and the second winding core portion 723a that has a larger number of turns. To implement this configuration, the first winding core portion 722a and the second winding core portion 723a can be located asymmetrically with respect to the core gap G. In this example, the number of turns of the winding portion 730a around the first winding core portion 722a is smaller than the number of turns of the winding portion 730a around the second winding core portion 723a. FIG. 4 schematically illustrates that the number of turns of the winding portion 730a around the first winding core portion 722a is about "2", and the number of turns of the winding portion 730a around the second winding core portion 723a is about "3". In practice, however, the number of turns of the winding portion 730a need not necessarily be in the range of 1 to 10, but instead may be, for example, in a range of 10 to 100. The difference between the number of turns of the winding portion 730a around the first winding core portion 722a and the number of turns of the winding portion 730a around the second winding core portion 723a is desirably 1 or more, or 2 or more, and is desirably 10 or less, or 5 or less.

In the case of winding the primary winding 711*a* around the first winding core portion 722*a* and the second winding core portion 723*a* at regular intervals, the first winding core portion 722*a* can be located on the side closer to the optical axis C0 so that the length L1 of the first winding core portion 722*a* and the length L2 of the second winding core portion 723*a* satisfy L1<L2. In another mode, even in a case where the first winding core portion 722*a* and the second winding core portion 723*a* have the same length, the winding interval of the primary winding 711*a* around the first winding core portion 722*a* may be smaller than the winding interval of the primary winding 711*a* around the second winding core portion 723*a*. In any case, the winding core portion having a smaller number of turns is located on the side closer to the optical axis C0 with respect the core gap G formed therebetween. When the transformer 700*a* is located in this manner, the magnetic field that reaches the image sensor 300 can be controlled. Putting a mark, such as a black triangle mark, for identifying the difference in the number of turns on the transformer 700*a* makes it possible to dispose the transformer 700*a* in an appropriate orientation. A black triangle mark is put on the side of the winding core portion having a smaller number of turns in the transformer 700*a*.

The first magnetic outer wall 724*a* is located on the opposite side of the core gap G in the axial direction of the first winding core portion 722*a*, and holds the first winding core portion 722*a*. The second magnetic outer wall 725*a* is located on the opposite side of the core gap G in the axial direction of the second winding core portion 723*a*, and holds the second winding core portion 723*a*. The first magnetic outer wall 724*a* and the second magnetic outer wall 725*a* are opposed to each other in the X-direction, and form side surfaces of the core portion. The first magnetic outer wall 724*a* and the first winding core portion 722*a* are integrally formed, but instead may be joined together with an adhesive. The second magnetic outer wall 725*a* and the second winding core portion 723*a* are integrally formed, but instead may be joined together with an adhesive. The first magnetic outer wall 724*a* and the second magnetic outer wall 725*a* may be formed by joining a plurality of members with an adhesive or the like, instead of being formed of a single member. The shape of each of the first magnetic outer wall 724*a* and the second magnetic outer wall 725*a* is not particularly limited and is, for example, a plate-like shape.

The third magnetic outer wall 726*a* is held by the upper portions of the first magnetic outer wall 724*a* and the second magnetic outer wall 725*a*. The third magnetic outer wall 726*a* is opposed to the mounting surface 728*a* to be connected to the printed-wiring board, and forms a top plate of the magnetic core. When the mounting surface 728*a* is mounted on the principal surface 2501, the first winding core portion 722*a* and the second winding core portion 723*a* are located between the third magnetic outer wall 726*a* and the principal surface 2501. The third magnetic outer wall 726*a* is integrally formed with the first magnetic outer wall 724*a* and the second magnetic outer wall 725*a*, but instead the third magnetic outer wall 726*a*, the first magnetic outer wall 724*a*, and the second magnetic outer wall 725*a* may be joined together with an adhesive. The third magnetic outer wall 726*a* may be formed by joining a plurality of members with an adhesive or the like, instead of being formed of a single member. The shape of the third magnetic outer wall 726*a* is not particularly limited and is, for example, a plate-like shape.

The magnetic core 720*a* that includes the first to third magnetic outer walls forms a magnetic path through which the magnetic flux generated by the first winding core portion 722*a* and the second winding core portion 723*a* flow. In terms of facilitating the flow of the magnetic flux through the magnetic path, the magnetic core 720*a* serving as the core portion is desirably integrally formed.

When a positive current is applied to the terminal 701*a*, the current flows through the winding portion 730*a* counterclockwise as viewed in the X1-direction. Then, roughly three types of magnetic flux are generated.

A first magnetic flux is a magnetic flux B3. As illustrated in FIG. 4, the magnetic flux B3 indicated by a dashed-dotted line is generated in the X2-direction on the inside of the winding portion 730*a*.

A second magnetic flux is a magnetic flux B1. As illustrated in FIGS. 4 and 5, the magnetic flux B1 leaking from the first magnetic outer wall 724*a* as indicated by an alternate long and two short dashes line is generated. The leaking magnetic flux B1 is located on the outside of the winding portion 730*a*, and flows counterclockwise on the plane of FIG. 4 in the Y2-direction with respect to the winding portion 730*a*, and also flows clockwise on the plane of FIG. 4 in the Y1-direction with respect to the winding portion 730*a*. The magnetic core 720*a* includes the third magnetic outer wall 726*a* that covers the winding portion 730*a* at the top surface side, thereby forming a magnetic path in the Z2-direction. Accordingly, the amount of the leaking magnetic flux B1 is less than that in a case where the third magnetic outer wall 726*a* is not included, so that the distribution of the magnetic flux is concentrated in the Z2-direction.

A third magnetic flux is a magnetic flux B2. As illustrated in FIG. 5, the magnetic flux B2 leaks from the core gap G as indicated by a dotted line. In the example of FIG. 5, the magnetic flux B2 leaks in the Z1-direction with respect to the winding portion 730*a*. This is because the magnetic core 720*a* includes the third magnetic outer wall 726*a*, and the magnetic flux B2 hardly leaks in the Z2-direction with respect to the winding portion 730*a*.

Figure 6:
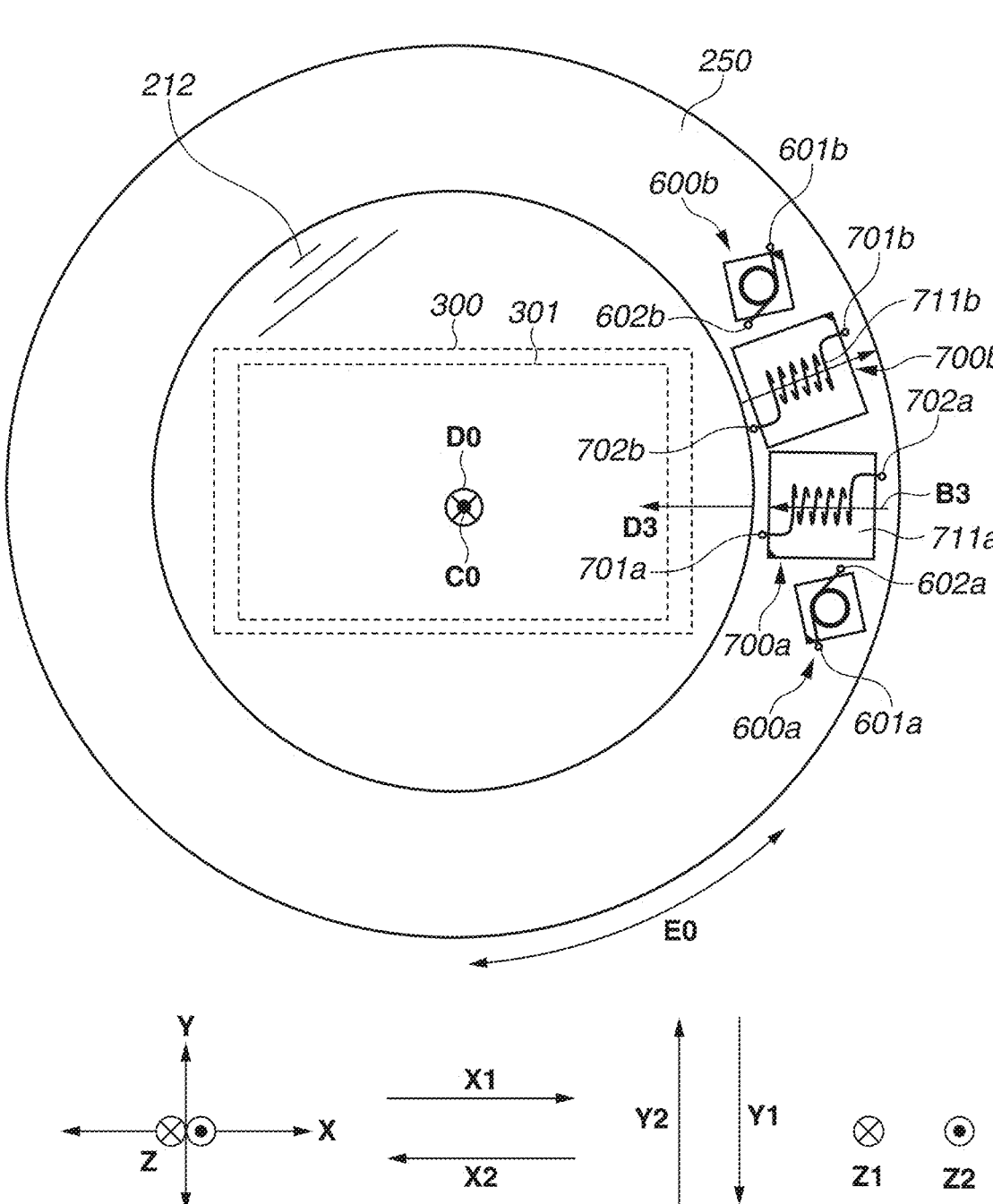
FIG. 6 is an explanatory diagram illustrating a positional relationship of components according to the first exemplary embodiment.

FIG. 6 is an explanatory diagram illustrating a positional relationship among components according to the first exemplary embodiment. Specifically, FIG. 6 illustrates an explanatory diagram illustrating a positional relationship among the inductor 600*a*, the inductor 600*b*, the transformer 700*a*, the transformer 700*b*, the printed-wiring board 250, the lens 212, and the image sensor 300 as viewed in the Z1-direction.

The primary winding 711*a* of the transformer 700*a* is wound counterclockwise from the terminal 701*a* toward the terminal 702*a* when the primary winding 711*a* is viewed in the first direction in which the optical axis C0 extends.

On the inside of the primary winding 711*a*, the magnetic flux B3 is generated by the current supplied to the primary winding 711*a* in a direction D3 that is orthogonal to the optical axis C0 and the direction DO. In this case, the optical axis C0 is located on an extension of the magnetic flux B3. Specifically, the transformer 700*a* is located such that the axial direction of each of the first winding core portion 722*a* and the second winding core portion 723*a* of the magnetic core 720*a* around which the primary winding 711*a* is wound is directed to the optical axis C0, and the axial direction intersects the optical axis C0.

The transformer 700*b* has a configuration in which the primary winding 711*b* is wound clockwise from the terminal 701*b* toward the terminal 702*b* when the primary winding 711*b* is viewed in the direction of the optical axis C0.

On the inside of the primary winding 711*b*, the current supplied to the primary winding 711*b* generates a magnetic flux in the direction opposite to the direction D3. In the transformer 700$b$, the axial direction of each of the first winding core portion 722$b$ and the second winding core portion 723$b$ of the core portion around which the primary winding 711$b$ is wound is directed to the optical axis C0, and the axial direction intersects the optical axis C0. The transformer 700$b$ is located such that a magnetic flux is generated in the direction opposite to the magnetic flux B3 generated by the transformer 700$a$, and the magnetic flux B3 is cancelled by the magnetic flux generated by the transformer 700$b$. However, the location of the transformer 700$b$ is not limited to this example. The transformer 700$b$ may be located such that a magnetic flux is generated in the same direction as the magnetic flux generated by the transformer 700$a$. Any other configuration may be employed as long as the effect of cancelling out the magnetic flux B1 and the magnetic flux B2 as described below can be obtained.

The inductor 600$a$ is located adjacent to the transformer 700$a$. The inductor 600$b$ is located adjacent to the transformer 700$b$. In the example of FIG. 6, two inductors and two transformers are mounted on one of the principal surfaces of the printed-wiring board 250, but instead may be mounted on the other principal surface of the printed-wiring board 250. The inductor 600$a$, the inductor 600$b$, the transformer 700$a$, and the transformer 700$b$ may be located at any positions in a circumferential direction E0 on the printed-wiring board 250. The inductor 600$a$, the inductor 600$b$, the transformer 700$a$, and the transformer 700$b$ may be arranged in any order in the circumferential direction E0.

The inductors 600$a$ and 600$b$ may have any configuration. For example, the configurations of the inductor and the printed circuit board discussed in Japanese Patent Application Laid-Open No. 2021-128288 can be used. The overall configuration including the imaging apparatus, the lens barrel, and the printed circuit board discussed in Japanese Patent Application Laid-Open No. 2021-128288 is referenced as an aid to describe the configuration according to the present exemplary embodiment. The inductor 600$a$ can include a winding portion, a pair of line portions pulled out to one side from the winding portion in a Xa-direction (not shown) of the X-Y plane direction, and a pair of electrodes that are located at an interval in a Ya-direction (not shown) orthogonal to the Xa-direction of the X-Y plane direction and are joined to the pair of line portions. The printed-wiring board 250 can include a pair of pads joined to the pair of electrodes, and a pair of wiring patterns extending from the pair of pads. Each of the pair of wiring patterns can extend from a portion corresponding to two-thirds of the length in the Xa-direction from the other end in the Xa-direction of the corresponding pad of the pair of pads. At least one of the pair of wiring patterns can extend from a portion corresponding to one-third of the length in the Xa-direction from the other end in the Xa-direction of the corresponding pad. At least one of the wiring patterns can extend from the other end of the corresponding pad. The at least one of the wiring patterns can include a portion that overlaps the inductor 600$a$ as viewed in the Z-direction orthogonal to the Xa-direction and the Ya-direction. The length of each of the pair of pads in the Xa-direction can be longer than the length of each of the pair of pads in the Ya-direction. The inductor 600$a$ can further include a magnetic core surrounding the winding portion. The drive circuit 30 supplies an alternating current to a load via the inductor 600$a$. This load may be an ultrasonic motor.

Figure 7A:
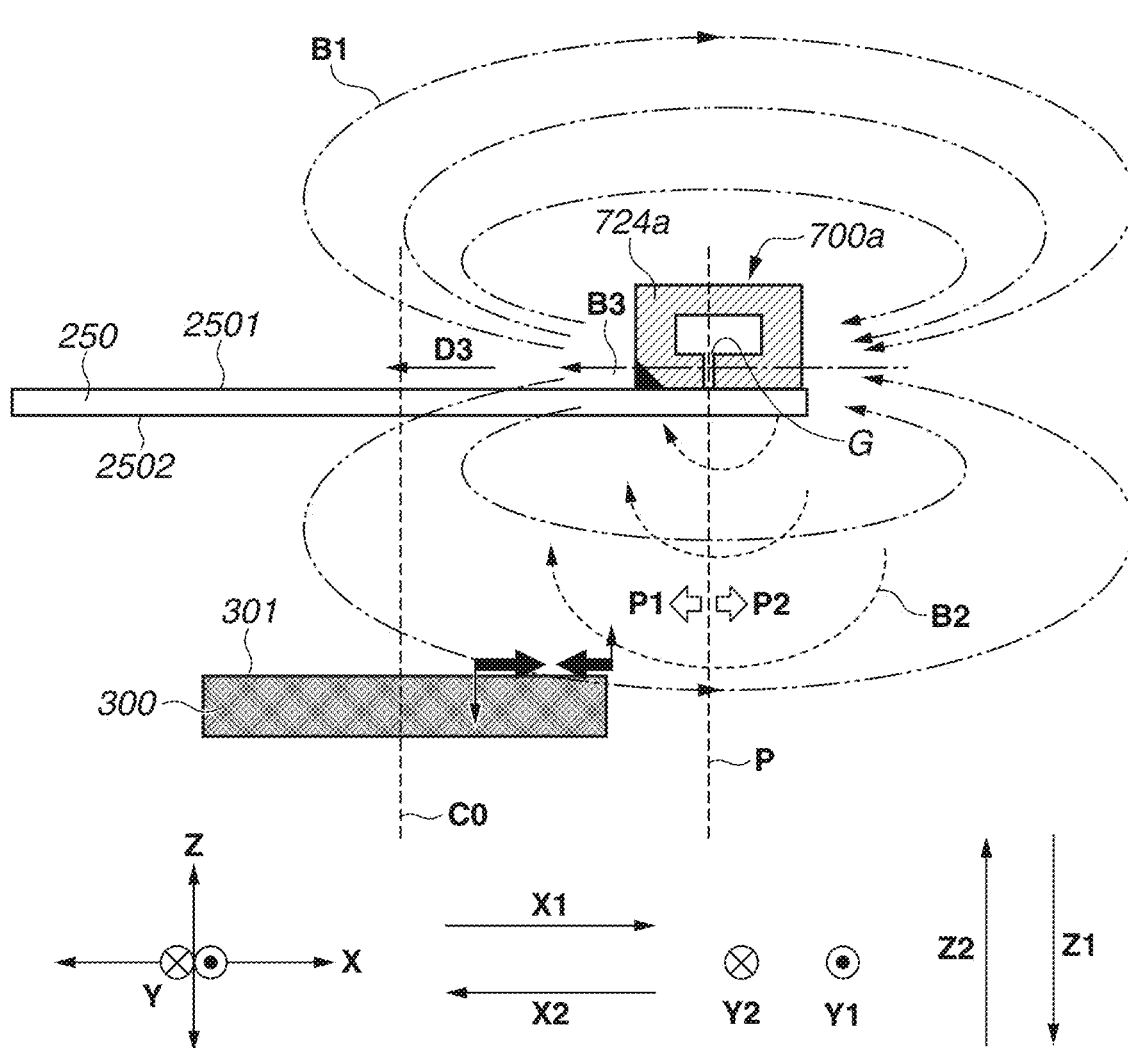
FIGS. 7A and 7B are explanatory diagrams each illustrating a magnetic flux leaking from the transformer according to the first exemplary embodiment.

FIG. 7A is an explanatory diagram illustrating a magnetic flux leaking from the transformer 700$a$ according to the first exemplary embodiment. In FIG. 7A, the transformer 700$a$, the printed-wiring board 250, and the image sensor 300 are viewed in the Y2-direction. In FIG. 7A, a current flows counterclockwise through the winding portion as viewed in the X1-direction. The magnetic flux B3 is generated in the X2-direction as indicated by a dashed-dotted line. The magnetic flux B1 leaking from the first magnetic outer wall 724$a$ is indicated by an alternate long and two short dashes line. The magnetic flux B2 leaking from the core gap G is indicated by a dashed line.

Figure 7B:
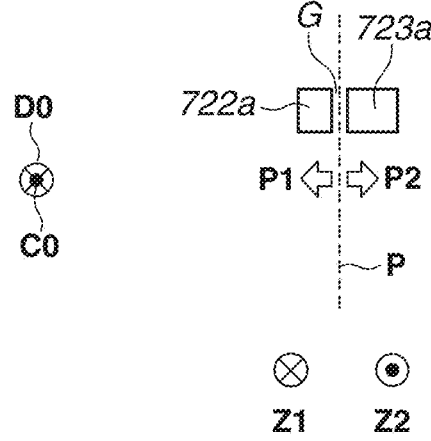

A positional relationship between the optical axis C0 and each of the first winding core portion 722$a$ and the second winding core portion 723$a$ will be described mainly with reference to FIG. 7B. FIG. 7B illustrates a positional relationship between the optical axis C0 and each of the first winding core portion 722$a$ and the second winding core portion 723$a$ as viewed in the direction in which the optical axis C0 of the lens 212 extends. Assume herein that the number of turns of the winding portion around the first winding core portion 722$a$ is smaller than the number of turns of the winding portion around the second winding core portion 723$a$. A virtual plane P is set such that the first winding core portion 722$a$ is located on a first side P1 that is one side of the virtual plane P, and the second winding core portion 723$a$ is located on a second side P2 that is the other side of the virtual plane P. In the plane P, the core gap G formed between the first winding core portion 722$a$ and the second winding core portion 723$a$ is located, and plane P is located between the first winding core portion 722$a$ and the second winding core portion 723$a$. As a result, the second winding core portion 723$a$ is not present on the first side P1 of the plane P, and the first winding core portion 722$a$ is not present on the second side P2 of the plane P. If the plane P is set as described above and the optical axis C0 is located on the first side P1 of the plane P, the first winding core portion 722$a$ is located on a side closer to the optical axis C0 than the second winding core portion 723$a$. In other words, one of the first side P1 and the second side P2 on which the optical axis C0 is located corresponds to the side closer to the optical axis C0 with respect to the plane P, and the other of the first side P1 and the second side P2 on which the optical axis C0 is not located corresponds to the opposite side of the side closer to the optical axis C0 with respect to the optical axis C0. The side closer to the optical axis C0 with respect to the plane P matches the first side P1 on which the first winding core portion 722$a$ having a relatively smaller number of turns is located with respect to the plane P. The opposite side closer to the optical axis C0 with respect to the plane P matches the second side P2 on which the second winding core portion 723$a$ having a relatively larger number of turns is located with respect to the plane P.

FIG. 7A illustrates a positional relationship between the plane P including the core gap G and the optical axis C0 as viewed in a direction perpendicular to the optical axis C0. FIG. 7A also illustrates a state where the first winding core portion 722$a$ is located on the side closer to the optical axis C0 than the second winding core portion 723$a$.

In the first exemplary embodiment, the image sensor 300 is an affected circuit. It has been known that a magnetic flux entering the light-receiving surface of an image sensor causes a disturbance in a captured image. In particular, a magnetic flux entering the light-receiving surface 301 of the image sensor 300 from the X-direction and the Y-direction is more likely to cause a disturbance in a captured image. This is because the magnetic flux entering the light-receiving surface 301 from the X-direction and the Y-direction is linked with a current loop formed by the image sensor 300 and the printed-wiring board 103 on which the image sensor 300 is mounted. To address this issue, it is known to provide a magnetic material between an image sensor as an affected circuit and a coil component as a noise source. Also, in the coil component discussed in Japanese Patent Application Laid-Open No. 2018-133354, an affected circuit is assumed to be located in a direction in which a plate-like core is provided and the plate-like core is used to shield the leaking magnetic flux. However, after intensive study, the inventor of the present disclosure has found that there is an arrangement of components in which various types of magnetic flux generated from transformers cancel each other out. Therefore, in the first exemplary embodiment, the transformer 700a to be mounted on the printed-wiring board 250 is mounted on the principal surface 2501 that is the principal surface farther from the light-receiving surface 301 of the image sensor 300.

In the digital camera 1000, the transformer 700a mounted on the printed-wiring board 250 in the lens barrel 200 and the image sensor 300 in the camera body 100 are spaced from each other in the X-direction and the Z-direction. With this configuration, the magnetic flux B1 leaking from the first magnetic outer wall 724a in the X2-direction curves and flows in the Z1-direction and the Z2-direction as illustrated in FIG. 7A, and the magnetic flux B1 flowing in the Z1-direction reaches the image sensor 300. On the light-receiving surface 301 of the image sensor 300, the leaking magnetic flux B1 includes X-direction components and Z-direction components. In the first exemplary embodiment, the magnetic core 720a includes the third magnetic outer wall 726a, and thus the amount of magnetism propagating in the Z1-direction is smaller than that in a case where the third magnetic outer wall 726a is not included.

The magnetic flux B2 leaking from the core gap G in the X1-direction curves and flows in the Z1-direction and reaches the image sensor 300 as illustrated in FIG. 7A. On the light-receiving surface 301 of the image sensor 300, the leaking magnetic flux B2 includes X-direction components and Z-direction components.

On the light-receiving surface 301, the X-direction components of the leaking magnetic flux B1 are directed in the X1-direction, while the X-direction components of the leaking magnetic flux B2 are directed in the X2-direction, which is opposite to the direction of the X-direction components of the leaking magnetic flux B1. Accordingly, on the light-receiving surface 301, the X-direction components of the leaking magnetic flux B1 and the X-direction components of the leaking magnetic flux B2 cancel each other out.

Further, in a case where the primary winding 711a is wound around the first winding core portion 722a and the second winding core portion 723a at regular intervals, L1<L2 is satisfied, where L1 is the length of the first winding core portion 722a in the direction D3, and L2 is the length of the second winding core portion 723a in the direction D3. In this case, the inventor of the present disclosure has found that the configuration in which the first winding core portion 722a is located in the direction D3, i.e., on the side closer to the optical axis C0 enables the magnetic flux B2 leaking from the core gap G to cancel the leaking magnetic field on the side closer to the image sensor 300, and to further cancel X1-direction components.

In another mode, relative positions of the primary winding 711a and the core gap G can be changed by changing the number of turns of the first winding core portion 722a and the number of turns of the second winding core portion 723a. In this case, the winding core portion having a smaller number of turns, e.g., the first winding core portion 722a, is located on the side closer to the optical axis C0, thereby obtaining the same advantageous effects as those described above. The magnetic flux B2 leaking from the core gap G cancels the leaking magnetic field on the side closer to the image sensor 300, and further cancels the X1-direction components.

Similarly, the number of turns of the secondary winding 712a around the first winding core portion 722a can be smaller than the number of turns of the secondary winding 712a around the second winding core portion 723a. However, in a case where the voltage on the secondary side is W (W>1) times the voltage on the primary side, assuming that the same power can be transmitted from the primary side to the secondary side, (primary voltage)×(primary current)= (secondary voltage)×(secondary current) holds, so that the secondary current is 1/W of the primary current. As a result, the secondary current is smaller than the primary current and the magnetic field generated by the secondary current is also smaller than the magnetic field generated by the primary current. Therefore, the number of turns of the winding portion of the secondary winding 712a around the first winding core portion 722a may be larger than the number of turns of the winding portion of the secondary winding 712a around the second winding core portion 723a, and the number of turns of the winding portion of the secondary winding 712a around the first winding core portion 722a may be equal to the number of turns of the winding portion of the secondary winding 712a around the second winding core portion 723a.

With the above-described action, magnetic field noise reaching the mage sensor 300 can be reduced, which leads to improvement in the quality of images generated by the image sensor 300. The same advantageous effects can be obtained not only in the transformer 700a, but also in the transformer 700b. The direction of the magnetic flux in the transformer 700b is different from that in the transformer 700a. However, regardless of the direction of the magnetic flux, the winding core portion having a smaller number of turns only needs to be located on the side closer to the optical axis C0 than the winding core portion having a larger number of turns. In the transformer 700b illustrated in FIG. 6, a black triangle mark is put on the side of the winding core portion having a larger number of turns.

Although not illustrated, in the first exemplary embodiment, if the second winding core portion 723a is located in the direction D3, i.e., on the side closer to the optical axis C0, the magnetic field noise in the X1-direction that is opposite side of the image sensor 300 can be reduced due to the effect of cancelling out magnetic flux. Accordingly, the effect of reducing the magnetic field noise reaching the image sensor 300 can be smaller than in a case where the first winding core portion 722a is located on the side closer to the optical axis C0. In this case, the magnetic field noise reaching the image sensor 300 can be reduced by, for example, locating the transformer 700a at a position far from the optical axis C0.

Reference Embodiment

Figure 8:
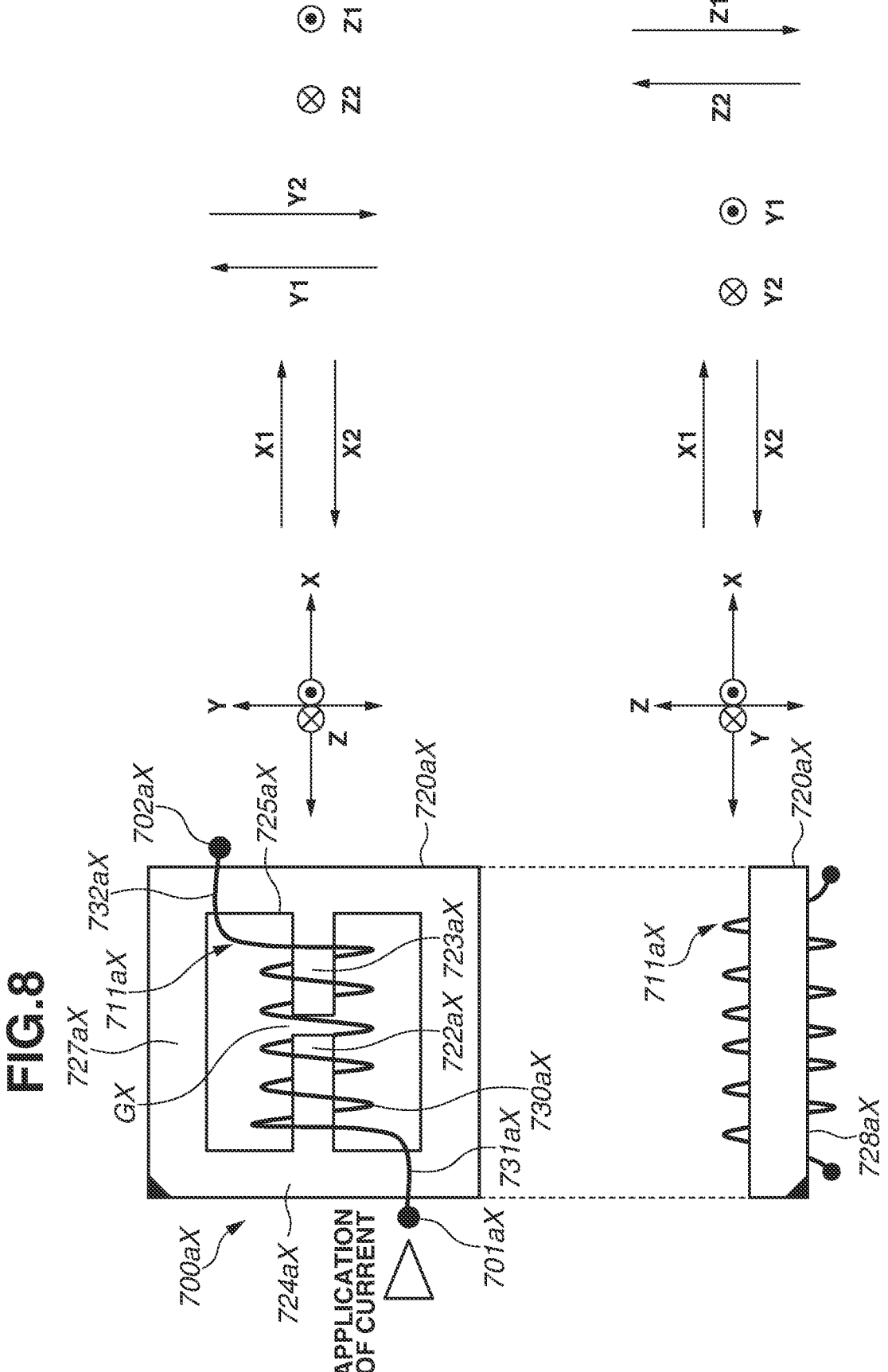
FIG. 8 is a schematic diagram illustrating a structure of a transformer according to a reference embodiment.

FIG. 8 is a schematic diagram illustrating a structure of a transformer according to a reference embodiment. FIG. 8 shows a bottom view of a transformer 700aX as viewed in the Z2-direction and a side view of the transformer 700aX as viewed in the Y2-direction.

The transformer 700aX includes a primary winding 711aX serving as a winding portion, a magnetic core 720aX serving as a core portion, and a secondary winding (not illustrated). The primary winding 711aX includes a winding portion 730aX, a pair of line portions 731aX and 732aX extending from the winding portion 730aX, and a pair of terminals 701aX and 702aX. The winding portion 730aX of the primary winding 711aX and the winding portion of the secondary winding are wound around a part of the magnetic core 720aX. The magnetic core 720aX serving as the core portion includes a first winding core portion 722aX, a second winding core portion 723aX, a first magnetic outer wall 724aX, a second magnetic outer wall 725aX, and a fourth magnetic outer wall 727aX. The first winding core portion 722aX and the second winding core portion 723aX are located with a gap therebetween in the axial direction in which the first winding core portion 722aX and the second winding core portion 723aX extend. In the example of FIG. 8, the first winding core portion 722aX and the second winding core portion 723aX are located with a core gap GX formed therebetween as a void.

The first magnetic outer wall 724aX is located on the opposite side of the core gap GX in the axial direction of the first winding core portion 722aX, and holds the first winding core portion 722aX. The second magnetic outer wall 725aX is located on the opposite side of the core gap GX in the axial direction of the second winding core portion 723aX, and holds the second winding core portion 723aX. The first magnetic outer wall 724aX and the second magnetic outer wall 725aX are opposed to each other in the X-direction and form side surfaces of the core portion.

The fourth magnetic outer wall 727aX is held by a side portion of each of the first magnetic outer wall 724aX and the second magnetic outer wall 725aX. The fourth magnetic outer wall 727aX is located in a direction perpendicular to a mounting surface 728aX to be connected to the printed-wiring board, and forms a side surface of the core portion. The first magnetic outer wall 724aX, the second magnetic outer wall 725aX, and the fourth magnetic outer wall 727aX are integrally formed. The transformer 700aX according to the reference embodiment differs from the transformer 700a according to the first exemplary embodiment in that the magnetic core 720aX does not include the third magnetic outer wall 726a. The amount of the magnetic flux leaking from the first magnetic outer wall 724aX in the transformer 700aX according to the reference embodiment is larger than that in the transformer 700a. This is because in the transformer 700a including the third magnetic outer wall 726a as a top plate, a wider magnetic path is formed on the top surface side and the distribution of magnetic flux is concentrated in the Z2-direction, while in the transformer 700aX, a narrower magnetic path is formed and the distribution of magnetic flux is concentrated on the magnetic outer wall. In the transformer 700aX according to the reference embodiment, a large amount of magnetic flux leaks from the first magnetic outer wall 724aX. Accordingly, even when a magnetic flux leaking from the core gap G is generated in the opposite direction, the effect of cancelling out magnetic flux on the light-receiving surface is small. Similarly, even when the position of the core gap G is changed, the effect of cancelling out magnetic flux on the light-receiving surface is small.

As described above, the transformer 700a includes the third magnetic outer wall 726a, which makes it possible to reduce the amount of the magnetic flux B1 leaking from the first magnetic outer wall 724a. The reduced magnetic flux B1 is cancelled by the magnetic flux B2 leaking from the core gap G on the light-receiving surface 301 of the image sensor 300 located below (Z1-direction) the printed-wiring board 250. The core gap G is located on the side closer to the optical axis C0, thereby further reducing the magnetic field noise on the light-receiving surface 301 of the image sensor 300. Consequently, the magnetic field noise reaching the image sensor 300 can be reduced, which leads to improvement in the quality of images generated by the image sensor 300.

Modified Example of First Exemplary Embodiment

Figure 9:
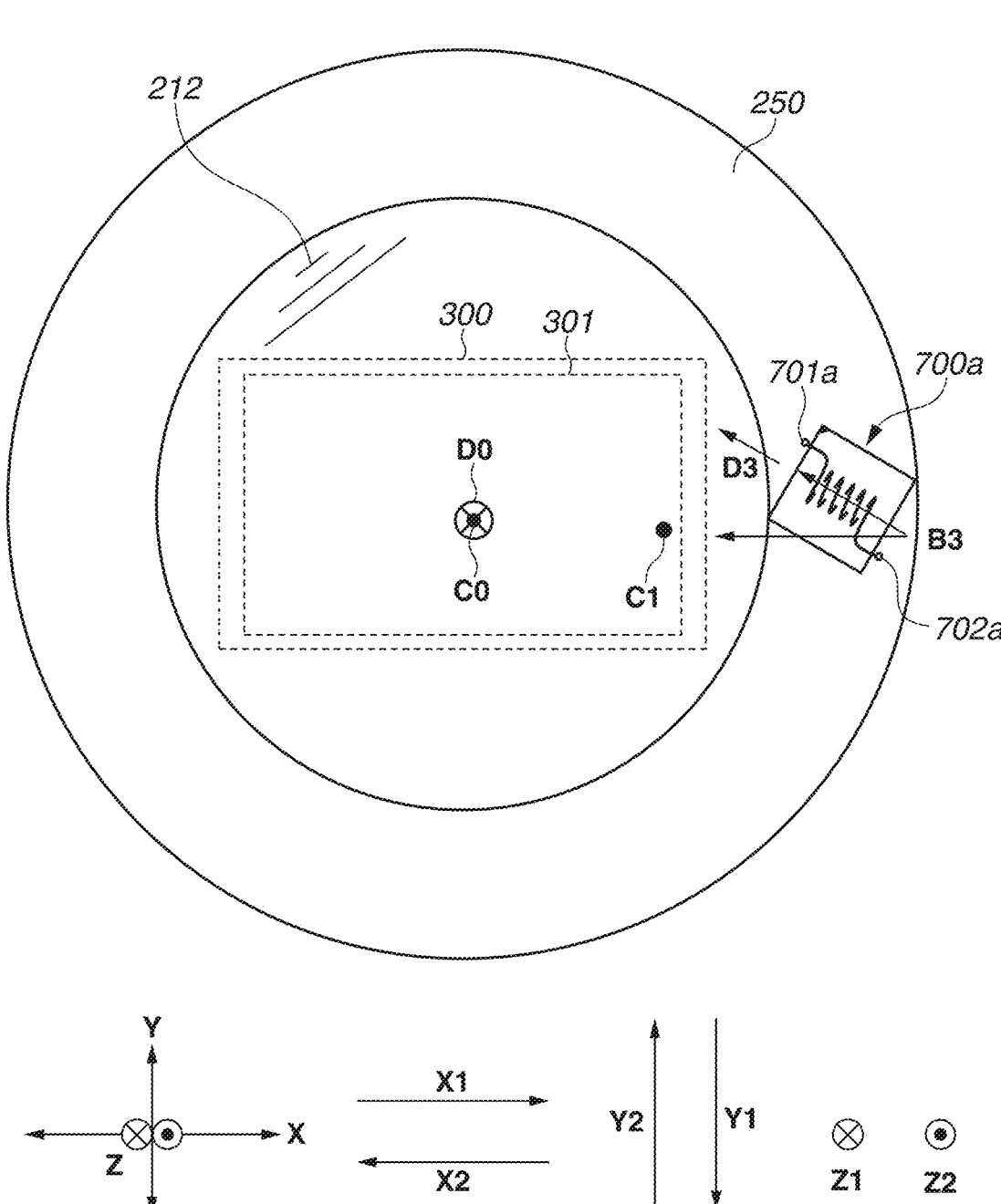
FIG. 9 is an explanatory diagram illustrating a positional relationship of components according to a modified example.

FIG. 9 is an explanatory diagram illustrating a positional relationship between components according to a modified example of the first exemplary embodiment. In the first exemplary embodiment described above, the axial direction of each of the first winding core portion 722a and the second winding core portion 723a around which the primary winding 711a is wound in the transformer 700a intersects the optical axis C0. However, the axial direction need not necessarily intersect the optical axis C0. As illustrated in FIG. 9, the axial direction of each of the first winding core portion 722a and the second winding core portion 723a may be rotated about 40° with respect to the axial direction in the first exemplary embodiment. Any other configuration may be employed as long as the effect of cancelling out the magnetic flux B1 and the magnetic flux B2 can be obtained.

However, in view of the anisotropy of the magnetic flux B1 and the magnetic flux B2, the axial direction of each of the first winding core portion 722a and the second winding core portion 723a around which the primary winding 711a is wound desirably intersects the optical axis C0. The magnetic flux B1 and the magnetic flux B2 spread in the Y-direction as the current flows in the X-direction, and spread in the X-direction as the current flows in the Y-direction. In the present exemplary embodiment, the transformer 700a is located on the outside of the image sensor 300 as viewed in the Z1-direction. In this case, when the axial direction intersects the optical axis C0, the total number of X-direction components and Y-direction components of the magnetic flux reaching the light-receiving surface 301 can be minimized Therefore, the axial direction of each of the first winding core portion 722a and the second winding core portion 723a around which the primary winding 711a is wound desirably intersects the optical axis C0.

Figure 10:
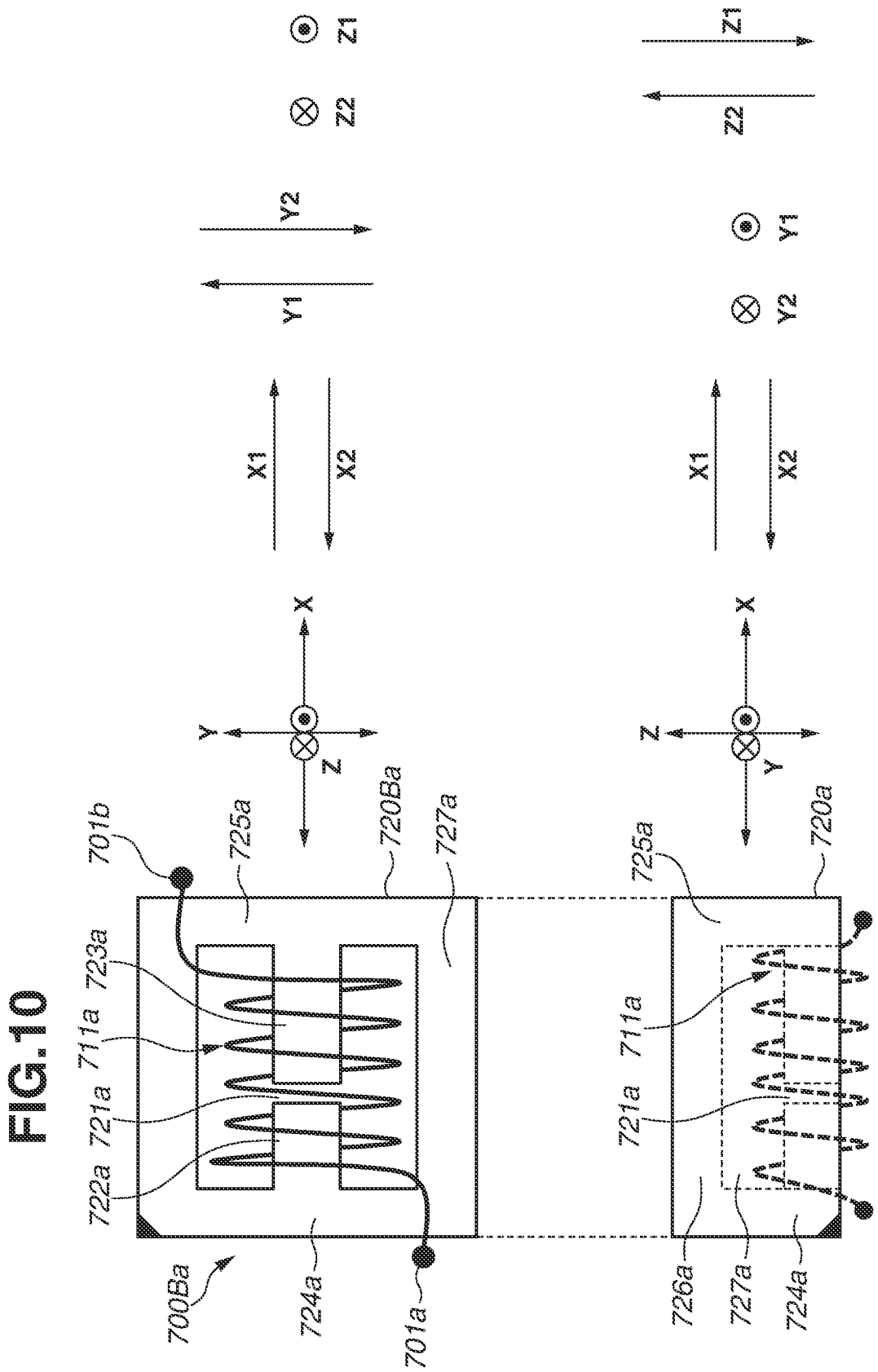
FIG. 10 is a schematic diagram illustrating a structure of a transformer as an example of a coil component according to a second exemplary embodiment.

A second exemplary embodiment differs from the first exemplary embodiment in the structure of a magnetic core of a transformer. A transformer according to the second exemplary embodiment differs from the transformer according to the first exemplary embodiment in that the magnetic core includes a fourth magnetic outer wall. FIG. 10 is a schematic diagram illustrating a structure of a transformer 700Ba according to the second exemplary embodiment. FIG. 10 shows a bottom view of the transformer 700Ba as viewed in the Z2-direction a side view of the transformer 700Ba as viewed in the Y2-direction. Components of the second exemplary embodiment that are similar to those of the first exemplary embodiment are denoted by the same reference numerals, and descriptions thereof are omitted.

The transformer 700B a includes the primary winding 711a serving as the winding portion, the magnetic core 720a serving as the core portion, and the secondary winding (not illustrated). The primary winding 711a includes the winding portion 730a, the pair of line portions 731a and 732a extending from the winding portion 730a, and the pair of terminals 701a and 702a. The winding portion 730a of the primary winding 711a and the winding portion of the secondary winding are wound around a part of a magnetic core 720B a.

The magnetic core 720Ba serving as the core portion includes the first winding core portion 722a, the second winding core portion 723a, the first magnetic outer wall 724a, the second magnetic outer wall 725a, the third magnetic outer wall 726a, a fourth magnetic outer wall 727a, and the mounting surface 728a including an opening. The first winding core portion 722a and the second winding core portion 723a are located with a gap therebetween in the axial direction in which the first winding core portion 722a and the second winding core portion 723a extend. In the example of FIG. 10, the first winding core portion 722a and the second winding core portion 723a are located with the core gap G formed therebetween as a void. The winding portion 730a of the primary winding 711a and the winding portion of the secondary winding are wound around the first winding core portion 722a and the second winding core portion 723a. The shape of each of the first winding core portion 722a and the second winding core portion 723a is not particularly limited and is, for example, a prism or cylindrical shape.

The first magnetic outer wall 724a is located on the opposite side of the core gap G in the axial direction of the first winding core portion 722a, and holds the first winding core portion 722a. The second magnetic outer wall 725a is located on the opposite side of the core gap Gin the axial direction of the second winding core portion 723a, and holds the second winding core portion 723a. The first magnetic outer wall 724a and the second magnetic outer wall 725a are opposed to each other in the X-direction, and form side surfaces of the magnetic core 720Ba. The shape of each of the first magnetic outer wall 724a and the second magnetic outer wall 725a is not particularly limited and is, for example, a plate-like shape.

The third magnetic outer wall 726a is held by upper portions of the first magnetic outer wall 724a and the second magnetic outer wall 725a. The third magnetic outer wall 726a is opposed to the mounting surface 728a to be connected to the printed-wiring board, and forms a top plate of the magnetic core 720Ba. The shape of the third magnetic outer wall 726a is not particularly limited and is, for example, a plate-like shape.

The fourth magnetic outer wall 727a is held by side portions of the first magnetic outer wall 724a and the second magnetic outer wall 725a. The fourth magnetic outer wall 727a is located in a direction perpendicular to the mounting surface 728a connected to the printed-wiring board, and forms a side surface of the magnetic core 720Ba. The first magnetic outer wall 724a, the second magnetic outer wall 725a, the third magnetic outer wall 726a, and the fourth magnetic outer wall 727a are integrally formed. In other words, the winding portion 730a of the primary winding 711a is covered by the magnetic core 720a, except for the mounting surface 728a. The shape of the fourth magnetic outer wall 727a is not particularly limited and is, for example, a plate-like shape.

The magnetic core 720Ba including the first magnetic outer wall 724a, the second magnetic outer wall 725a, the third magnetic outer wall 726a, and the fourth magnetic outer wall 727a forms a magnetic path through which the magnetic flux generated by the first winding core portion 722a and the second winding core portion 723a flows. When a positive current is applied to the terminal 701a, the current flows through the winding portion 730a counterclockwise as viewed in the X1-direction.

In the second exemplary embodiment, the image sensor 300 is an affected circuit. If the magnetic flux enters the light-receiving surface 301 of the image sensor 300 from the X-direction and the Y-direction, a disturbance is more likely to occur in a captured image.

In the digital camera 1000, the transformer 700Ba mounted on the printed-wiring board 250 in the lens barrel 200 and the image sensor 300 in the camera body 100 are spaced apart from each other in the X-direction and the Z-direction. With this configuration, the magnetic flux B1 leaking from the first magnetic outer wall 724a in the X2-direction curves and flows in the Z1-direction and the Z2-direction, and the magnetic flux B1 flowing in the Z1-direction reaches the image sensor 300. On the light-receiving surface 301 of the image sensor 300, the leaking magnetic flux B1 includes X-direction components and Z-direction components. In the second exemplary embodiment, the magnetic core 720Ba includes the third magnetic outer wall 726a, and thus the amount of magnetic flux flowing in the Z1-direction is smaller than in a case where the third magnetic outer wall 726a is not included. In the second exemplary embodiment, the transformer 700Ba includes the fourth magnetic outer wall 727a, and thus the amount of the magnetic flux B1 that leaks from the first magnetic outer wall 724a and flows in the Z1-direction is smaller than in a case where the fourth magnetic outer wall 727a is not included.

Meanwhile, in the second exemplary embodiment, the magnetic flux B2 leaking from the core gap G in the X1-direction curves and flows in the Z1-direction, and then reaches the image sensor 300. On the light-receiving surface 301 of the image sensor 300, the leaking magnetic flux B2 includes X-direction components and Z-direction components. The difference between the leaking magnetic flux B1 and the leaking magnetic flux B2 in the second exemplary embodiment is smaller than that in the first exemplary embodiment.

On the light-receiving surface 301, the X-direction components of the leaking magnetic flux B1 are directed in the X1-direction, while the X-direction components of the leaking magnetic flux B2 are directed in the X2-direction, which is opposite to the direction of the X-direction components of the leaking magnetic flux B1. Accordingly, on the light-receiving surface 301, the X-direction components of the leaking magnetic flux B1 and the X-direction components of the leaking magnetic flux B2 cancel each other out.

In the case of winding the primary winding 711a around the first winding core portion 722a and the second winding core portion 723a at regular intervals, like in the first exemplary embodiment, the first winding core portion 722a is located in the direction D3, i.e., on the side closer to the optical axis C0, assuming that L1<L2 is satisfied, where L1 is the length of the first winding core portion 722a in the direction D3, and L2 is the length of the second winding core portion 723a in the direction D3. With this configuration, the magnetic flux B2 leaking from the core gap G cancels the leaking magnetic field on the side closer to the image sensor 300, and further cancels the X1-direction components. In another mode, relative positions of the primary winding 711a and the core gap G can be changed by changing the number of turns of the first winding core portion 722a and the number of turns of the second winding core portion 723a. In this case, the winding core portion having a smaller number of turns, for example, the first winding core portion 722a is located on the side closer to the optical axis C0, thereby obtaining the same advantageous effects as those described above. That is, the magnetic flux B2 leaking from the core gap G cancels the leaking magnetic field on the side closer to the image sensor 300, and further cancels the X1-direction components.

With the above-described action, magnetic field noise reaching the mage sensor 300 can be reduced, which leads to improvement in the quality of images generated by the image sensor 300.

Figure 11A:
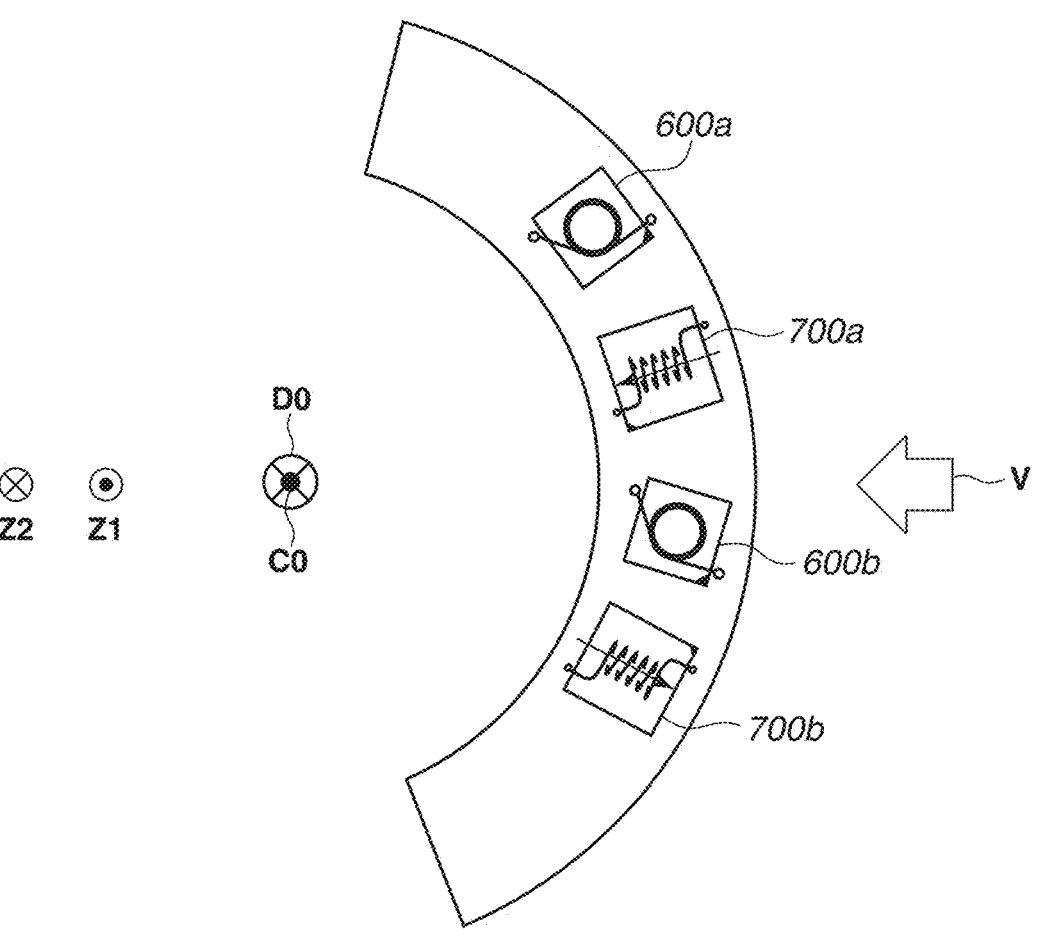
FIGS. 11A and 11B are explanatory diagrams each illustrating a positional relationship of components according to a third exemplary embodiment.
Figure 11B:
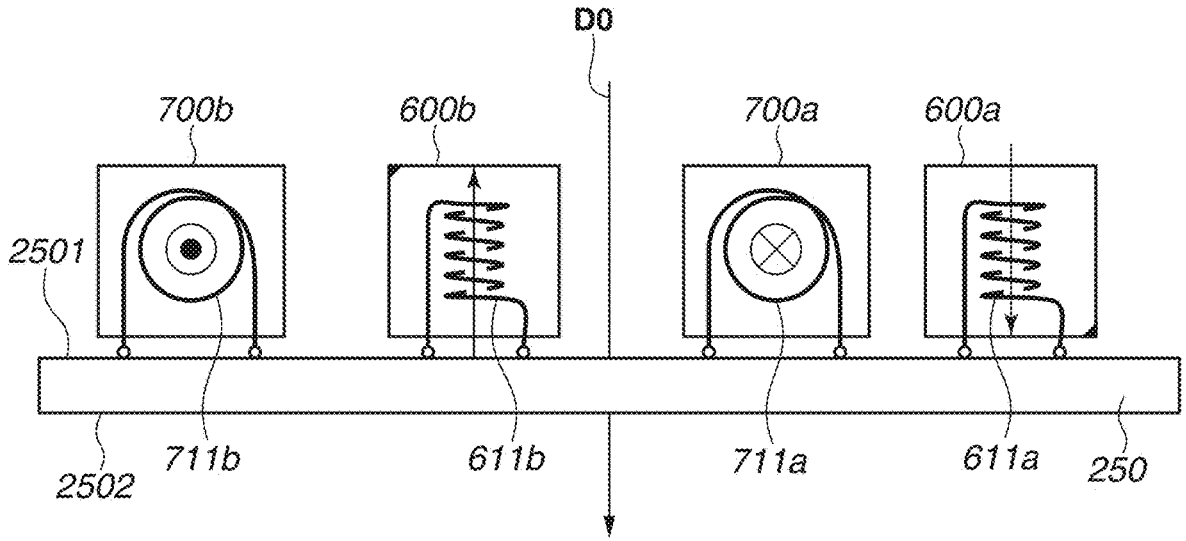

A coil component according to a third exemplary embodiment will be described with reference to FIGS. 11A and 11B. FIG. 11A illustrates the drive module 500 as viewed in the same direction as in FIG. 6A. FIG. 11B illustrates the drive module 500 as viewed in a direction V illustrated in FIG. 11A. Like in the first exemplary embodiment, the drive module 500 includes the printed-wiring board 250 and the two inductors 600a and 600b and the two transformers 700a and 700b that are mounted (implemented) on the printed-wiring board 250. In both of the first and third exemplary embodiments, the inductor 600a generates a magnetic flux toward the printed-wiring board 250 (toward the image sensor 300) in the direction DO. The inductor 600b generates a magnetic flux toward the opposite side of the printed-wiring board 250 (opposite side of the image sensor 300). FIG. 11B illustrates the respective directions of the magnetic fluxes passing through windings 611a and 611b of the inductors 600a and 600b. The transformer 700a generates a magnetic flux toward the optical axis C0, and the transformer 700b generates a magnetic flux toward the opposite side of the optical axis C0. FIG. 11B illustrates the respective directions of the magnetic fluxes passing through windings 711a and 711b of the transformers 700a and 700b, like in the first exemplary embodiment.

In the first exemplary embodiment illustrated in FIGS. 1 and 6, the inductor 600a, the transformer 700a, the transformer 700b, and the inductor 600b are arranged in this order clockwise or counterclockwise (counterclockwise in the example illustrated in FIGS. 1 and 6). On the other hand, in the third exemplary embodiment illustrated in FIGS. 11A and 11B, the inductor 600a, the transformer 700a, the inductor 600b, and the transformer 700b are arranged in this order clockwise or counterclockwise (clockwise in the example illustrated in FIGS. 11A and 11B). In this manner, it is desirable to alternately arrange a transformer and an inductor, such as the A-phase transformer 700a and inductor 600a and the B-phase transformer 700b and inductor 600b. The arrangement of transformers and inductors as described above enables magnetic fields to cancel each other out and reduce the magnetic field reaching the image sensor 300. In a modified example, the transformer 700a, the inductor 600a, the transformer 700b, and the inductor 600b may be arranged in this order clockwise or counterclockwise. Alternatively, the transformer 700a, the inductor 600b, the transformer 700b, and the inductor 600a may be arranged in this order clockwise or counter clockwise. Yet alternatively, the inductor 600b, the transformer 700a, the inductor 600a, and the transformer 700b may be arranged in this order clockwise or counterclockwise. Also, in the present exemplary embodiment, the configurations of the inductor and the printed circuit board discussed in Japanese Patent Application Laid-Open No. 2021-128288 can be used.

EXAMPLES

A simulation was carried out on a magnetic flux generated in the transformers according to the first exemplary embodiment, the reference embodiment, and the second exemplary embodiment described above. The following description is given assuming that Sample 1 and Sample 2 indicate the simulation result corresponding to the first exemplary embodiment, Sample 3 indicates the simulation result corresponding to the reference embodiment, and Sample 4 indicates the simulation result corresponding to the second exemplary embodiment.

A simulation was carried out under the following conditions using CST Studio Suite® (manufactured by Dassault Systemes K.K.).

The size of the magnetic core 720a of Sample 1 was set as follows. That is, the third magnetic outer wall 726a has a size of 2.2 mm (X-direction)×4 mm (Y-direction)×0.8 mm (Z-direction), and the first magnetic outer wall 724a and the second magnetic outer wall 725a have a size of 0.8 mm (X-direction)×4 mm (Y-direction)×3.28 mm (Z-direction). Each of the first winding core portion 722a and the second winding core portion 723a has a prism shape in which a section (Y-Z section) as viewed in the X-direction has a rectangular shape of 2.55 mm (Y-direction)×1.25 mm (Z-direction), the length of the first winding core portion 722a in the X-direction is 1.02 mm, and the length of the second winding core portion 723a in the X-direction is 1.1 mm. The core gap G has a size of 80 μm. The primary winding 711a has a diameter of 60 μm and is wound around the first winding core portion 722a and the second winding core portion 723a with 24 turns.

The number of turns of winding around the first winding core portion 722a is 10 or 11, and the number of turns of wiring around the second winding core portion 723a is 13 or 14. The number of turns at the core gap G is less than one. The secondary winding 712a has a diameter of 20 μm and is wound around the first winding core portion 722a and the second winding core portion 723a with 384 turns. The axial direction of each of the first winding core portion 722a and the second winding core portion 723a extends in a direction intersecting the optical axis C0. A voltage on the secondary side (secondary winding 712a) is 16 times as high as a voltage on the primary side (primary winding 711a).

Sample 2 was set to have a mounting state which is rotated 180° from the structure of Sample 1. Specifically, Sample 2 has the prism shape in which the length of the first winding core portion 722a in the X-direction is 1.02 mm and the length of the second winding core portion 723a in the X-direction is 1.1 mm, and the second winding core portion 723a is located on the side closer to the optical axis C0.

The size of the magnetic core 720aX of Sample 3 was set as follows. That is, the fourth magnetic outer wall 727aX has a size of 4.5 mm (X-direction)×6.2 mm (Y-direction)×2.4 mm (Z-direction). The first magnetic outer wall 724aX and the second magnetic outer wall 725aX have a size of 0.65 mm (X-direction)×6.2 mm (Y-direction)×2.4 mm (Z-direction). Each of the first winding core portion 722aX and the second winding core portion 723aX has a prism shape in which a section (Y-Z section) as viewed in the X-direction has a rectangular shape of 2.55 mm (Y-direction)×1.25 mm (Z-direction), the length of the first winding core portion 722a in the X-direction is 2.195 mm, and the length of the second winding core portion 723a in the X-direction is 2.275 mm. The core gap G has a size of 80 μm.

The primary winding 711aX has a diameter of 80 μm and is wound around the first winding core portion 722aX and the second winding core portion 723aX with 24 turns. The secondary winding 712aX has a diameter of 40 μm and is wound around the first winding core portion 722aX and the second winding core portion 723aX with 384 turns. The axial direction of each of first winding core portion 722a and the second winding core portion 723a extends in the direction intersecting the optical axis C0.

The size of the magnetic core 720a of Sample 4 was set as follows. That is, the third magnetic outer wall 726a has a size of 4.5 mm (X-direction)×6.2 mm (Y-direction)×0.575 mm (Z-direction), and the first magnetic outer wall 724a and the second magnetic outer wall 725a have a size of 0.65 mm (X-direction)×6.2 mm (Y-direction)×2.4 mm (Z-direction). The fourth magnetic outer wall 727a has a size of 4.5 mm (X-direction)×0.625 mm (Y-direction)×3.05 mm (Z-direction). Each of the first winding core portion 722a and the second winding core portion 723a has a prism shape in which a section (Y-Z section) as viewed in the X-direction has a rectangular shape of 2.55 mm (Y-direction)×1.25 mm (Z-direction), the length of the first winding core portion 722a in the X-direction is 2.195 mm, and the length of the second winding core portion 723a in the X-direction is 2.275 mm. The core gap G has a size of 80 μm.

The primary winding 711a has a diameter of 80 μm and is wound around the first winding core portion 722a and the second winding core portion 723a with 24 turns. The secondary winding 712a has a diameter of 40 μm and is wound around the first winding core portion 722a and the second winding core portion 723a with 384 turns.

The axial direction of each of the first winding core portion 722a and the second winding core portion 723a extends in the direction intersecting the optical axis C0.

The transformers of Sample 1, Sample 2, Sample 3, and Sample 4 are each located such that a middle point of the transformer component is 24 mm apart from the optical axis C0 as viewed in the Z2-direction. The mounting surface of each transformer is located at a position that is 28 mm apart from the light-receiving surface 301 of the image sensor 300 as viewed in the Y2-direction. The image sensor 300 is located such that the light-receiving surface 301 has a size of 36 mm (X-direction)×24 mm (Y-direction) and the optical axis C0 passes through the center of the light-receiving surface.

A current having a frequency of 90 kHz and a current effective value of 100 mA was caused to flow through the primary winding. The secondary winding was provided with a load that corresponds to the drive motor 50 and has a configuration in which a capacitor of 470 pF and a resistor of 47Ω are connected in parallel.

Each magnetic core has permeability of 2400, and each winding is made of copper.

Simulation results are shown below.

TABLE 1

|  | X-direction Maximum Value [nT] | Y-direction Maximum Value [nT] | Square-root of Sum of Squares [nT] |
|---|---|---|---|
| Sample 1 | 5.2 | 5.5 | 7.6 |
| Sample 2 | 10.0 | 2.4 | 10.3 |
| Sample 3 | 9.4 | 6.3 | 11.3 |
| Sample 4 | 2.9 | 2.8 | 4.0 |

First, comparing Sample 1 with Sample 2, a maximum value of X-direction components of the magnetic flux reaching the light-receiving surface in Sample 1 is smaller than that in Sample 2, and the square-root of the sum of the squares in Sample 1 is smaller than that in Sample 2, so that the total effect on the image sensor 300 decreases. As a result, the magnetic field noise reaching the image sensor 300 in Sample 1 can be further reduced compared to Sample 2, and thus it can be expected that the quality of images generated by the image sensor 300 can be improved.

Next, comparing Sample 1 with Sample 4, a maximum value of each of X-direction components and Y-direction components of the magnetic flux reaching the light-receiving surface in Sample 4 is smaller than that in Sample 1. This is considered to be because the surface area of the magnetic core in Sample 4 including the fourth magnetic outer wall is larger than that in Sample 1, and the amount of magnetic flux leaking from the first magnetic outer wall in Sample 4 is further reduced compared to Sample 1. As a result, the magnetic field noise reaching the image sensor in Sample 4 can be reduced, and thus it can be expected that the quality of images generated by the image sensor 300 can be further improved.

Figure 12:
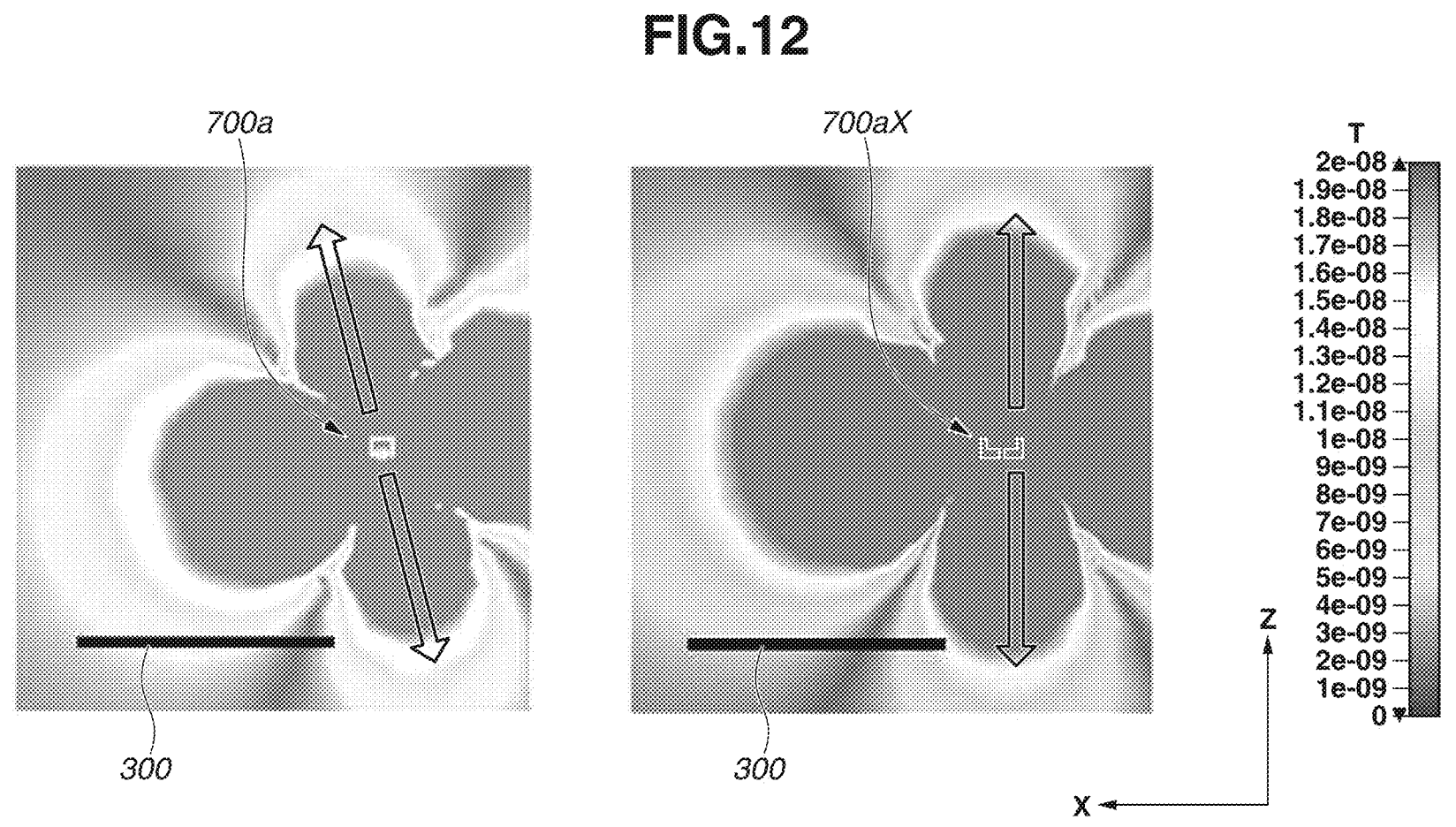

Next, comparing Sample 3 with Sample 4, a maximum value of each of X-direction components and Y-direction components of the magnetic flux reaching the light-receiving surface in Sample 4 is much smaller than that in Sample 3. This is considered to be because the surface area of the magnetic core in Sample 4 including the fourth magnetic outer wall is larger than that in Sample 3, and the amount of magnetic flux leaking from the first magnetic outer wall is reduced, so that the effect of cancelling out magnetic flux can be fully exerted with the amount of the magnetic field leaking from the core gap G. FIG. 12 illustrates a distribution of the magnetic field of X-direction components from a transformer component to an image sensor surface in a magnetic field simulation. In Sample 4, the core gap G is located on the image sensor surface side to control the direction of the leaking magnetic field. Thus, it can be seen that a radiation pattern axis is tilted leftward so as to avoid the image sensor surface as compared with Sample 3.

This configuration makes it possible to reduce the magnetic field noise reaching the image sensor 300, and thus it can be expected that the quality of images generated by the image sensor 300 can be further improved.

The present disclosure is not limited to the above-described exemplary embodiments and can be modified in various ways within the technical idea of the present disclosure. The advantageous effects described in the exemplary embodiments are merely enumeration of the most desirable effects that can be obtained from the present disclosure, and the advantageous effects of the present disclosure are not limited to those described in the exemplary embodiments.

While the exemplary embodiments described above illustrate an example where the transformer generates a magnetic flux that causes magnetic field noise in the image sensor 300, the inductors 600a and 600b may generate the magnetic flux. Alternatively, the inductor 600c mounted (implemented) on the principal surface 1041 of the printed-wiring board 104 illustrated in FIG. 2 may generate the magnetic flux. In this case, the inductor 600c may be desirably mounted such that the axial direction is directed to the virtual line IMO perpendicularly extending from the center of the light-receiving surface 301 of the image sensor 300. Examples of the component that generates the magnetic flux may include an inductor of an output filter portion of a switching power circuit located adjacent to the image sensor 300, and an inductor used for a drive circuit to supply an alternating current, such as a DC brush motor for driving a shutter. Also, in a case where a transformer similar to the transformer 700a is mounted on the principal surface 1041 of the printed-wiring board 104, the winding core portion around which the winding portion is wound with a relatively smaller number of turns can be located on the side closer to the optical axis C0 of the image sensor 300 than the winding core portion around which the winding portion is wound with a relatively larger number of turns.

While the exemplary embodiments are described above based on an example where the digital camera 1000 is used as the imaging apparatus, the imaging apparatus according to the present disclosure is not limited to a digital camera. For example, a mobile phone, a smartphone, a tablet terminal, and a notebook computer can also be applied as the imaging apparatus according to the present disclosure.

The disclosed content of the present specification includes not only what is explicitly described herein, but also all that is ascertainable from the present specification and the drawings attached hereto. The disclosed content of the present specification also includes complementary sets of concepts described in the present specification. Specifically, if there is a description, in the present specification, that "A is B", for example, it is assumed that the present specification discloses that "A is not B", even if the description that "A is not B" is omitted. This is because, if it is described that "A is B", it is premised on a case where "A is not B".

According to the present disclosure, it is possible to improve the quality of captured images.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-183493, filed Nov. 16, 2022, which is hereby incorporated by reference herein in its entirety.

What is claimed is:

1. A lens barrel comprising:
a lens;
a printed-wiring board located on an outside of the lens as viewed in a first direction in which an optical axis of the lens extends, the printed-wiring board including a first principal surface on an object side in the first direction and a second principal surface on an imaging plane side in the first direction;
a coil component including a winding portion and a core portion, the coil component being mounted on the first principal surface of the printed-wiring board; and
a drive circuit configured to supply an alternating current to a load via the coil component,
wherein the core portion includes:
a first winding core portion and a second winding core portion located with a gap therebetween in an axial direction in which the first and second winding core portions extend, the winding portion being wound around the first winding core portion and the second winding core portion;
a first magnetic outer wall located in the axial direction and configured to hold the first winding core portion, and a second magnetic outer wall located in the axial direction and configured to hold the second winding core portion; and
a third magnetic outer wall configured to be held by the first magnetic outer wall and the second magnetic outer wall,
wherein the first winding core portion and the second winding core portion are located between the third magnetic outer wall and the first principal surface, and
wherein a number of turns of the winding portion around the first winding core portion with respect to the gap is smaller than a number of turns of the winding portion around the second winding core portion with respect to the gap, the winding portion with the smaller number of turns around the first winding core portion is oriented towards the optical axis, and the first winding core portion is located on a side closer to the optical axis than the second winding core portion.

2. The lens barrel according to claim 1, wherein the coil component is located such that the axial direction is directed to the optical axis.

3. The lens barrel according to claim 1,
wherein the core portion further includes a fourth magnetic outer wall configured to be held by side portions of the first magnetic outer wall and the second magnetic outer wall, and
wherein the core portion covers the winding portion except for a mounting surface of the coil component.

4. The lens barrel according to claim 1, wherein the load is a drive motor configured to drive the lens.

5. The lens barrel according to claim 1, wherein the coil component is a transformer configured to step up a voltage output from the drive circuit.

6. The lens barrel according to claim 1, further comprising a connected portion configured to be attached to and detached from an imaging apparatus including an image sensor.

7. A camera comprising:
an imaging apparatus including an image sensor; and
the lens barrel according to claim 1, the lens barrel including a connected portion configured to be attached to and detached from the imaging apparatus.

8. A camera comprising:
the lens barrel according to claim 1; and
an image sensor.

9. The camera according to claim 8, wherein the coil component is located such that the axial direction is directed to a virtual line extending in a perpendicular direction from a center of a light-receiving surface of the image sensor.

10. An imaging apparatus comprising:
an image sensor;
a printed-wiring board including a first principal surface located on a side closer to the image sensor, and a second principal surface located on an opposite side of the side closer to the image sensor;
a coil component including a winding portion and a core portion, the coil component being mounted on the second principal surface of the printed-wiring board; and
a drive circuit configured to supply an alternating current to a load via the coil component,
wherein the core portion of the coil component includes:
a first winding core portion and a second winding core portion located with a gap therebetween in an axial direction in which the first and second winding core portions extend, the winding portion being wound around the first winding core portion and the second winding core portion;
a first magnetic outer wall located in the axial direction and configured to hold the first winding core portion, and a second magnetic outer wall located in the axial direction and configured to hold the second winding core portion; and
a third magnetic outer wall configured to be held by upper portions of the first magnetic outer wall and the second magnetic outer wall, and
wherein a number of turns of the winding portion around the first winding core portion with respect to the gap is smaller than a number of turns of the winding portion around the second winding core portion with respect to the gap, and the winding portion with the smaller number of turns around the first winding core portion is oriented towards an optical axis, and the first winding core portion is located on a side closer to an optical axis of the image sensor than the second winding core portion.

11. The imaging apparatus according to claim 10, wherein the coil component is located such that the axial direction is directed to a virtual line extending in a perpendicular direction from a center of a light-receiving surface of the image sensor.

12. The imaging apparatus according to claim 10, wherein the core portion further includes a fourth magnetic outer wall configured to be held by side portions of the first magnetic outer wall and the second magnetic outer wall, and wherein the core portion covers the winding portion except for a mounting surface of the coil component.

13. The imaging apparatus according to claim 10, further comprising an actuator configured to control a position of the image sensor.

14. The imaging apparatus according to claim 10, wherein the coil component is configured to remove a part of a current output from the drive circuit.

* * * * *